US012775747B2

(12) United States Patent
Halna Du Fretay et al.

(10) Patent No.: US 12,775,747 B2
(45) Date of Patent: Oct. 27, 2026

(54) UNIVERSAL, ENDURING, UNIQUE IDENTITY SYSTEM AND METHOD

(71) Applicant: Self.me, LLC, Wilmington, NC (US)

(72) Inventors: Brett Halna Du Fretay, Wilmington, NC (US); John Paul Tomaszewski, Tomball, TX (US)

(73) Assignee: SELF.ME, LLC, Wilmington, NC (US)

( * ) Notice: Subject to any disclaimer, the term of this patent is extended or adjusted under 35 U.S.C. 154(b) by 361 days.

(21) Appl. No.: 18/401,600

(22) Filed: Dec. 31, 2023

(65) Prior Publication Data

US 2025/0217515 A1 Jul. 3, 2025

(51) Int. Cl.
*G06F 21/62* (2013.01)

(52) U.S. Cl.
CPC ................................ *G06F 21/6263* (2013.01)

(58) Field of Classification Search
CPC .. G06F 21/62; G06F 21/6218; G06F 21/6245; G06F 21/6263
See application file for complete search history.

(56) References Cited

U.S. PATENT DOCUMENTS

2019/0205563 A1* 7/2019 Gonzales, Jr. ....... G06Q 20/389
2020/0125757 A1* 4/2020 McKendree ........ G06F 21/6218
2020/0265162 A1* 8/2020 Khi ....................... H04L 9/3218
2021/0178697 A1* 6/2021 Nilakantan ............ G06Q 10/06
2021/0357441 A1* 11/2021 Zhuo ................... G06F 16/3322
2023/0172510 A1* 6/2023 Alford ................... A61B 5/167 434/236
2023/0214398 A1* 7/2023 Kazmierczak .... G06F 16/24573 707/722
2023/0274287 A1* 8/2023 Blaikie, III ........... H04L 9/3239 705/50

* cited by examiner

*Primary Examiner* — Devin E Almeida
(74) *Attorney, Agent, or Firm* — Seyfarth Shaw LLP

(57) ABSTRACT

A system and method are provided relating to universal, eternal (enduring), self-sovereign identity. Various aspects of personal information may be stored. Identity information, including an individual's thoughts, experiences, observations, goals, hopes, and desires may be stored, and identifiers, e.g., government- or institution-issued documents, such as diplomas and licenses. Various configurations, e.g., relating to access or events, may be applied to information. Further, information may be entered into a persistent database using one or more keys and may depend on selected configurations. Persistent database embodiments include a distributed ledger and blockchain. A visual code may link a user with specific portions of personal information in a persistent database or repository. Potential employers may access certain personal information during a hiring process. Artificial intelligence software may access certain personal information to depict an avatar expressing a personal identity.

11 Claims, 8 Drawing Sheets

UNIVERSAL, ENDURING, UNIQUE IDENTITY SYSTEM AND METHOD

BACKGROUND

Fundamentally, existing identity management systems emphasize the capacity to distinguish one entity from another. This is not really "Identity"; it is more "Identification". It is worth noting that identification is still a useful activity. The ability to distinguish one person from another is the basis of human society. However, that is not really "Identity". Identifiers present "what" we are. Identity is "who" we are. As noted below, existing identity management schemes tend to manage characteristics and credentials. This is "what" a person is. There is little to no attempt to determine "who" the person is in these types of identity management schemes. The resultant effect is that existing schemes are really "identifier management schemes" as they do not consider the wider scope of "who" a person is. This is because existing identity management schemes are not developed from the perspective needs of the person or entity who has the identity, but from the perspective needs of the person or entity that is relying on the identifier.

As a result, existing schemes developed for persons or entities relying on identifiers are generally neither universal, eternal, nor self-sovereign, much less all three at once. For example, existing schemes may not be universal because they do not permit every individual—whether alive or deceased—to access or participate in the scheme. Existing schemes may not be eternal because those relying on the schemes strongly prefer identifiers distinguishing between living and deceased individuals. Existing schemes may not be self-sovereign because the implementer of the scheme, e.g., an identification issuing authority, retains a portion of control over the scheme (and generally a relatively large portion of control, such as the authority to revoke an identification document, including by preset time limitations, or outright ownership of an identification document).

Even taking aside the fact that identity management schemes do not really deal with "identity" but with "identifiers", a major problem in the exercise of identity management is that existing identity management approaches focus primarily on the "possession" or knowledge of specific facts or "characteristics". These sets of characteristics are sometimes referred to as identification characteristics. They are generally used because an identity management system assumes that only one person will have the unique combination of characteristics. For example, existing identification schemes may provide identification characteristics that do not change, such as information about how an individual physically looks, e.g., eye color, hair color, height, and weight; coupled with age and fingerprint data. Other existing identification schemes may use characteristics that do change, such as information about where a person physically lives, and in which governmental jurisdiction.

To ensure reliability of the characteristic or artifact that the scheme uses to establish an identity, developers of existing identification schemes often look to improved technology. For example, new identification cards may have specific technological features to prevent forgery. Identity scheme developers usually continue developing reliability processes by including identification characteristics that were not available in previous forms of identification cards because existing technology could not capture them. Examples of this are seen in how developers have included color photographs and fingerprints over the years. However, existing identification schemes do not include content about an individual's actual experiences or thoughts.

Credentials are another type of identification characteristic. Credentials are generally artifacts related to specific expertise. For example, an education credential, such as a diploma, may state that a person successfully completed a set of coursework. Society may deem that person a "graduate" of a certain institution located in a certain governmental jurisdiction. However, the credential does not provide content about the individual's actual experiences or thoughts in connection with the coursework. It may provide details about what the institution may have expected the person to have done during certain time periods, for example, attended a particular class on a particular day to take a test, or visited a certain class that the institution designated over a certain time period (such as a semester long course). A credential may also provide the institution's assessment of the person's actions during that time period, e.g., a "grade." However, these credentials do not provide content about the person's actual experiences or thoughts—that person's actual "Identity". Credentials are also not unique. Many individuals graduate from the same educational institution with the same credentials, even at the same time.

Another problem with existing identity management schemes is that they are typically based on the needs of the relying party (e.g., the recipient of the identity proof) or the legal framework of a sovereign. Existing identity management schemes rarely are based on the needs of the person who has the actual "Identity." Governments establish identification systems to benefit the government's own operational purposes. For example, a government may choose not to establish identification for a migrant population because it does not wish to track those individuals in connection with the government's functions. This may occur if the government does not wish to provide benefits to those individuals. On the other hand, a government may choose to establish identification for a migrant population so that the government can easily track those individuals. This may occur, for example, if the government wishes to tax those individuals.

Other institutions, whether governmental or non-governmental, may establish other identity management schemes, or utilize the management schemes of still other institutions. Such schemes are rarely based on the needs of the person who has the actual "identity," and are instead for the benefit of the institutions. Other examples of institutions implementing identification schemes include public transportation authorities issuing a driver's license, schools issuing a school identification card, and libraries issuing a library card.

In some instances, other non-issuing institutions may rely upon an identification scheme implemented by a different institution. For example, a public transportation authority, such as a state department of transportation, may require drivers to apply for a license to drive a vehicle on a public road. The public transportation authority may issue the license, and use it to establish identification for drivers. Other institutions may further require, or prefer, to use the public transportation authority's issued license to establish identification of an individual. For example, a private bank may require or prefer to use such a license to establish identification of an individual and permit access to an account. Such management schemes are a further step removed from the individual's actual "identity."

A further problem with existing identity management schemes is that typically, the issuing institution can control the issued identification, e.g., by revoking or otherwise cancelling it, and even by retaining ownership of the identification (despite an individual's possession of the identification). In the example of an institution such as a private or public school, when a student graduates, fails to pay tuition, or drops out, then the school may revoke the identification. In other instances, the issuing authority's revocation is a preset time period, and a default condition of the identification itself, e.g., a driver's license may state when it expires. In other instances, the issuing authority may actually own a physical identification card, and could demand return or destruction of the card. An individual who fails to comply may face consequences, including contractual or legal consequences. Similarly, an individual possessing an identification card that has been revoked may also face contractual or legal consequences for using, or attempting to use, the card to establish identification.

An additional problem with existing identity management schemes is the lack of uniqueness. Typically, an issuing authority will strictly control the formatting and presentation of information. For example, a public transportation authority issuing a license may require certain poses and dimensions for a photograph. The issuing authority may also require certain information to be in textual format, when it could be in other format(s), and may require that information to be in particular portions of the license. For example, an issuing authority may require eye color information to be conveyed only with text, and further, only text corresponding to a prescribed set of eye colors. Therefore, such schemes may not accurately or precisely capture an individual's unique features. Generally, issuing authorities restrict uniqueness and require uniformity only for the benefit of the issuing authority, e.g., to promote efficiency for the issuing authority, not to reflect an individual's unique identity.

A further problem with existing identity management schemes is that there is a single point of certification. This can cause existing schemes to be susceptible to identity theft. First, issuing authorities frequently store all of the information about a set of individuals in a single database. Therefore, if the database is breached, then multiple different individuals' identities may be at risk of theft at the same time. Second, institutions frequently rely upon a different institution's issued identification, but lack the capability to confirm its authenticity. For example, a bank may rely on a license issued by a public transportation authority to open a new account. However, the bank may be unable to quickly confirm the authenticity of a license presented at the bank to a very high degree of accuracy. In contrast, if the license was presented to a law enforcement officer (who may or may not work for the issuing authority) that officer is more likely to be capable of quickly confirming the authenticity of the license to a very high degree of accuracy.

Additionally, embodiments of existing identity management schemes can change, or even disappear, over time. For example, governments make identification cards valid only for a certain time period. Further, existing government identification systems generally use a set of limited identity artifacts (e.g., ID numbers). Over time, as the population expands, government identification systems suffer from replication, where governments must use an identical set of identification characteristics for different individuals. Currently, in the United States, the social security numbering system is limited because it provides for a large, but still finite number of unique social security numbers. See, e.g., Social Security Number Randomization, available at https://www.ssa.gov/employer/randomization.html ("There are approximately 420 million numbers available for assignment."); Carolyn Puckett, *The Story of the Social Security Number*, Social Security Bulletin, Vol. 69, No. 2, 2009. In the past, governments have expanded the identification characteristics to avoid this problem, for example by adding more names to an identification card, or more specific information about a person's age or residence.

In the current digital age, "who" (as opposed to "what") an entity is has become a pressing problem. Advertisers try to create detailed profiles on individuals so that the advertisers can try to predict when a person will be interested in making a purchasing decision. This activity is not a function of "what" a person is, but "who" they are. Similarly, privacy compliance programs are in place so that individuals can enjoy the subjective state of having control over information relating to them, and exercising that control in a manner consistent with their values and interests. Human interaction with collaborative artificial intelligence will need to have effective means for understanding "who" the human is since the artificial intelligence will need to be able to understand the person's goals, values, and interests to achieve the desired collaboration. These are examples of modern, digital-age use situations where the need to determine the "who"—the identity—is more important than the need to determine the distinguishing characteristics related to a mere identifier.

A further problem with existing identity management schemes is that institutions cannot accurately understand or consider an individual's identity in connection with that individual's identification. This hampers the efficiency of a typical business' goals to understand its customer or client. For example, when a bank relies upon a driver's license to open an account, the institution is not using, and cannot use, the identification to accurately understand the individual's identity. An institution further cannot use identification to periodically update its understanding of an individual's identity. A further existing problem is that current identity schemes that focus on traditional identifiers cannot adequately provide services in connection with deceased individuals. For example, many current identity schemes only focus on living individuals, and providing services in connection with them. Current schemes may not attribute any identity to a deceased individual. To the extent that current schemes do consider whether someone is deceased, it is to prevent issuance or renewal of a traditional identification in connection with the deceased individual. In this manner, current schemes distinguish whether the individual is living or deceased, but largely to exclude deceased individuals.

A further existing problem is that technology, such as artificial intelligence software, typically relies on preset sources of information to learn or train. Common sources of preset information are media that more than one human generates, or that no human creates.

Accordingly, no prior art technology can accurately understand or consider an individual's identity through certain preset sources of information. This can be problematic because artificial intelligence technology designed to communicate with humans cannot have an identity that is tied to an individual. Accordingly, such artificial intelligence lacks any identity, or has an unformed or inchoate identity. There is also a risk that an artificial intelligence may have multiple unformed or inchoate identities. For example, when trained on enormous data sources, such as a digital library or the Internet, an artificial intelligence may effectively be a mix of multiple different human identities, and may have a collective identity of humanity as a whole. In no case currently, however, can an artificial intelligence have a single, complete identity. Because "who" entities are is much more complex and varied than just the characteristics that distinguish one entity from another, this kind of system has the beneficial side effect of also being a highly robust way of having confidence in the uniqueness of an individual. An identity management scheme focusing on the "who" is also highly reliable for having confidence in the "what."

Aspects of the present disclosure are directed to overcoming one or more problems with existing identity management systems.

SUMMARY OF THE PREFERRED EMBODIMENTS

Provided is a system or method for managing information comprising providing portions of personal information to a repository, selecting at least one access configuration for each portion, and entering one or more portions into a persistent database. The system or method may further comprise embodiments where the personal information comprises identifier information, and identity information. The identifier information comprises at least one copy of a document issued by a government, or by an educational institution, and said government or institution has authenticated the document. Such authentication may occur through mathematical proof of work on the persistent database or also through an institutional verification of the information. The identity information comprises at least one image, audio recording, video recording, portion of text, or portion of data connected to a personal experience or event.

Further provided is a system or method for selecting at least one event configuration for each portion of information. The repository may also comprise a database, and the portions of personal information are provided to the database through the Internet. The access configurations may comprise selecting whether zero, one, or more individuals have access to each of the selected portions through the Internet. The access configurations may also comprise selecting whether one or more categories of individuals may have access to each of the selected portions through the Internet. The entering into a persistent database comprises conveying or entering a portion of personal information into the persistent database using one or more keys. Such persistent database is distributed across a plurality of machines. Additionally, a visual code identifies the portions of personal information entered into the persistent database. In a further embodiment, one or more of the plurality of machines authenticates the entering of the one or more portions of personal information into the persistent database. Such authentication is by mathematical proof of work.

Further provided is a system or method where a user provides portions of personal information into the repository. At least one portion of the personal information comprises identity information further comprising at least one image, audio recording, video recording, portion of text, or portion of data connected to a personal experience. Such an experience may be an event. At least one portion of the personal information may comprise identifier information such as a copy of a document issued by a government, or a copy of a document issued by an educational institution. The user may select at least one access configuration for each portion. A configuration may permit individuals or institutions, including potential employers, to view at least one selected portion of identity information, and at least one portion of selected identifier information. Such configuration may permit the individuals or institutions to provide information about potential opportunities to the user.

Further provided are embodiments where the persistent database is a distributed ledger or a blockchain. The user may access a distributed ledger with a visual code. The user may also enter at least one portion of personal information into the distributed ledger using a key known to selected individuals or institutions, including potential employers. The user may otherwise permit access to the individuals or institutions through the ledger and also through the user's repository. At least one individual or institution, including potential employer may access at least one portion of the user's personal information through the distributed ledger, and may access other portions through the user's repository.

Other embodiments provide for a repository that is a cloud service and may be connected to the Internet. In such an embodiment, the distributed ledger is a blockchain. A visual code identifies the portions of personal information entered into the blockchain. Further provided is a system or method for managing information. In such embodiments, a repository contains portions of personal information, and a user may access each of the portions. The user may select at least one access configuration for each of the portions. The repository further may be operably connected to a persistent database, and capable of entering one or more portions into the persistent database. Also provided are embodiments where the user provided the portions of personal information, and the user is the only user having access to all of the portions of personal information.

Further provided is a system or method of interaction comprising a repository containing portions of information about a person's experience. A software program may access the contents of the repository. The software may also access a visual representation that is an avatar of the person. A user may communicate with the software through the visual representation, e.g., communicating with the avatar through text or speech or body movement. The software is capable of receiving the user's communication, selecting information from the repository factually related to the communication, and causing the digital representation to present a summary of the information to the user. The repository may be a cloud service, and contain a plurality of portions of information about a person's work experiences. The software is capable of selecting information about one or more work experiences and causing the digital representation to present a summary of the one or more work experiences to the user. The repository may also be a cloud service that contains a plurality of portions of information about a deceased person's life. The repository may only be accessible by the software. In this embodiment, the software comprises artificial intelligence, and has accessed all of the portions of information about the person's life. A plurality of users are capable of communicating with the software, and the software is capable of generating a communication based on the plurality of portions of the information, and one or more users' communications with the software. The software is also operably connected to a blockchain. In this manner, the software may conduct transactions on the blockchain, e.g., cryptocurrency transactions in response to a communication. Alternatively, the software may also conduct such transactions based on programming or generative algorithms independent of any user's communication.

Further provided is a system comprising an identity corpus that contains information about a person's experience, and metadata linking those portions together. A software program may have accessed the identity corpus, and developed a generative model based on the contents. The software may also receive an input from anywhere outside of the computer where the software is located, and based on the generative model, may determine whether and how to convey a response to the input. In certain embodiments, the content of the identity corpus does not change after the person's death. Alternatively, the identity corpus may change based on new information from any outcome related to the input and the response. The software program may also cause the generative model to change or revise itself based on any new content within the identity corpus.

Further provided is a method comprising providing portions of personal information to an identity corpus, which may be a type of electronic storage repository. The method contemplates developing a software behavioral model based on the portions of personal information, and providing information to the model, whereupon the model may generate a response based on the provided information. In one embodiment, the person who provided the personal information would also provide metadata in the identity corpus linking the portions of personal information to each other based on at least time and location information. A further embodiment involves changing the behavioral model based on the outcome of the software's response, for example, whether the response successfully resolved the environmental stimulus or input. Similarly, the identity corpus may change based on the outcome (e.g., event information would be added and linked to personal information in the corpus). The behavioral model may also change based on the changes to the identity corpus.

DETAILED DESCRIPTION

Aspects of the present disclosure describe an inventive, universal, eternal, self-sovereign unique identity system. Aspects of the present disclosure include a system that electronically stores numerous and various aspects of an individual's identity. Such a system stores an individual's thoughts, experiences, observations, goals, hopes, and desires. These aspects of identity are stored electronically, including through video and audio recordings, written documentation, and metadata. The system may store each of these aspects on an encoded blockchain. In preferred embodiments, the system stores only identifiers on the blockchain. However, the system also contemplates other, less preferred embodiments where a data subject may store any information on the blockchain. Others having the requisite levels of permission may access portions of the blockchain. Other information storage and distribution includes one or more machines connected to the Internet, and through a cloud service, although requisite levels of permissions may still be required for accessing such information.

The system further offers a distinctive identifier in the form of a visual code. The blockchain may be further accessible or linked to devices through such a visual code (e.g., a "QR" code). One aspect of the system is the QR code's effectively limitless array of combinations. Furthermore, this system is enduring (eternal) due to the registration of the QR code on the blockchain, creating an immutable digital record. The system also instills trust as the data stored on the blockchain remains unmodifiable. Therefore, identifiers stored on the blockchain are more trustworthy. The system is universal because any individual may use the system for their identity, and because the blockchain may permanently store such information. In typical embodiments, stored information on blockchain may only be identifiers. The disclosed system is unique because each blockchain reflects a different individual's identifiers. In such a system, the identification is the QR code because typically a single QR code would correspond to a blockchain reflecting a single individual's identity.

Figure 1:
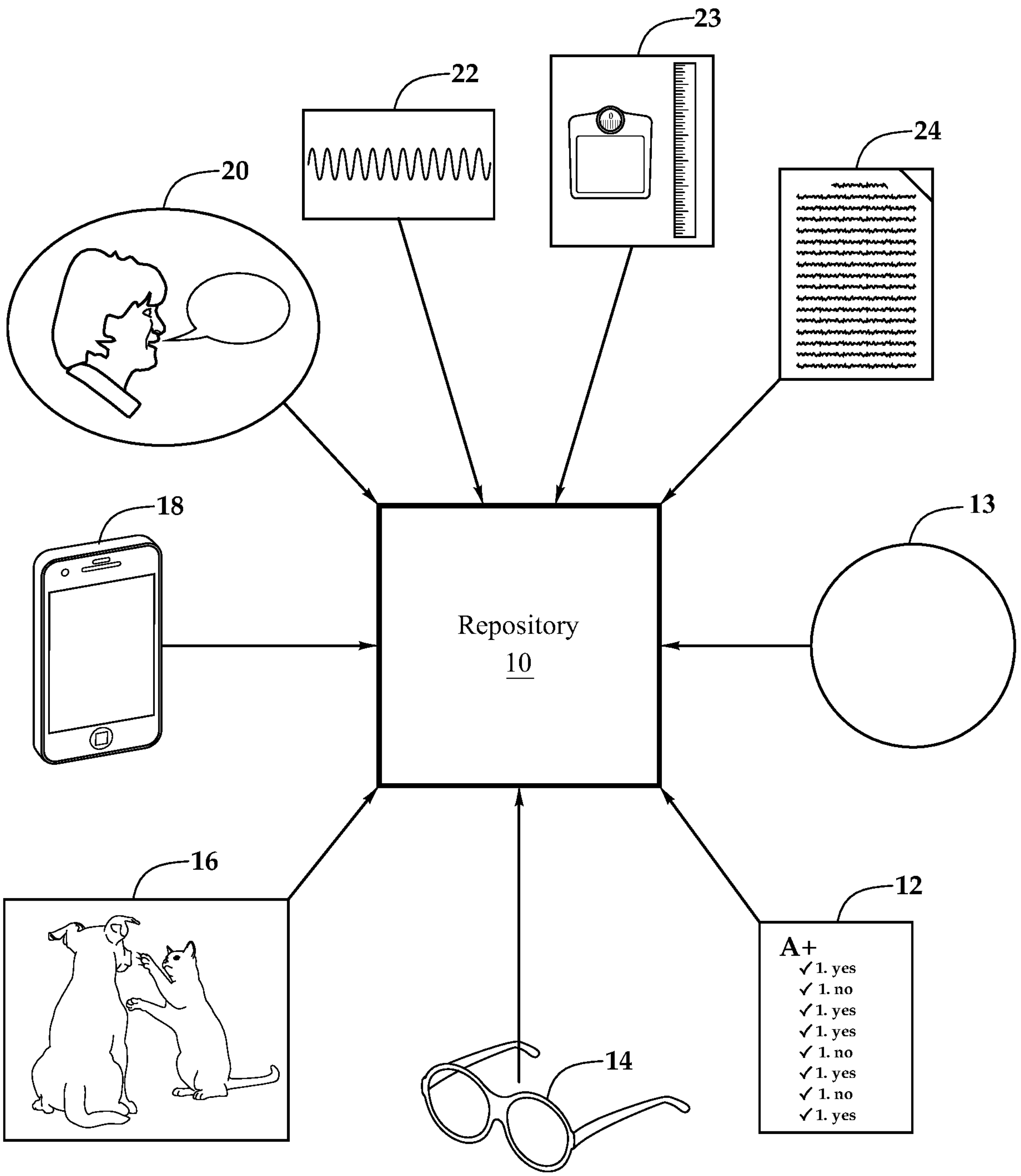
FIG. 1 is a block diagram illustrating an embodiment of a repository for storing information.

FIG. 1 is a block diagram illustrating an exemplary embodiment of a repository 10 for storing information. In most embodiments, the repository 10 is an electronic database for storing information in digital form. The repository 10 may store many types of information from various sources, including physical texts 12, visual information 14, including what a person may see through smart eyeglasses and/or audio-visual information (e.g., a photo 16) emitted by a device, other information from a device, including location information 18, sound or noise, such as voices 20, biometric information 22, body mass index 23, and electronic writings 24. Other types of information are contemplated, including information from any source that may be digitized 13. In a preferred embodiment, an individual maintains control over all aspects of that individual's repository 10, including any information stored upon it, or deleted from it.

A user would typically access the repository 10 through a secure connection on the Internet, for example, an encrypted connection. The repository 10 may be located on a server, or may be located on more than one machine through a cloud-based service. The repository 10 may be located on a medium that is unconnected to the Internet, including an electronic storage device. In other embodiments, the repository 10 may be located on a private network unconnected to the Internet. In still other embodiments, the repository 10 may be a dedicated portion of a machine, e.g., a file folder, or a portion of a hard drive. In that way, many different repositories may exist on a single machine.

In most embodiments, a data subject (or "subject") would use and have access to a single repository 10. Typically, a data subject is an adult human. However, aspects of the present disclosure contemplate other embodiments where a data subject may be a collection of humans, such as a group, a couple, a family, one or more deceased humans, or a collection of living and deceased humans. A data subject generally has access to the repository 10 at all times. In some embodiments, a data subject would access the repository 10 through a smartphone, and may enter information into the repository 10 using the smartphone's connection to the Internet. In a preferred embodiment, a data subject is a human who would have control over any and all access to a repository 10. After death, technology, typically software such as artificial intelligence, would retain the same level of control that the human (when alive) had over the repository 10. For example, the technology would have control of the repository 10, including management of the repository 10, the information within it, and the information that is or may be added to it. In typical embodiments, the artificial intelligence ("AI") is designed to be presented visually and depict the human data subject, and also communicate with humans through the depiction (e.g., an "AI avatar"). The AI avatar is a digital likeness and embodiment of the individual. Importantly, the AI avatar may be used whether the individual is alive or deceased.

A data subject may also control who else may access the repository 10, including employers, or whether certain electronic devices may have access. Typical access permissions, or configurations, would include the ability to read, write and/or edit data. In preferred embodiments, the data subject would grant a read-only access permission to employers for certain categories of data. For example, a subject may grant to employers a category of information that is public and appropriate for employment purposes. A subject would retain private information and not release the private information to anyone. A subject may receive into the repository 10 feedback or comments from others, and determine whether and how to share that content. Regardless of who or what has access to the repository 10, typically through a configuration assigned to each and every portion of information within the repository 10, in a preferred embodiment, the data subject would ultimately control the repository's contents at all times. For example, in preferred embodiments, a data subject may permanently delete any content in the repository 10, regardless of who or what added the content, or when they added it.

In other, generally less preferred embodiments, a data subject would not have access to the repository 10. This may be because that subject is a minor, subject to some form of guardianship, is deceased, or because of an agreement such as an employment agreement.

Any permitted device connected electronically to the repository 10 may enter information into the repository 10. As examples, a permitted device may be a smartphone, a video recorder, a camera, or any other instrument capable of measuring any conditions, including information about electronic activities (e.g., network conditions or activities of others on electronic systems), biometric information, audio and visual information, temperature, humidity, elevation, seismography, presence of liquids, chemicals or gases. A permitted device may also be software that is programmed or designed to interact with the repository 10. A permitted device may also include any other instrument or measurement device. The permitted device may be controlled by one or more individuals, or by a combination of software and one or more individuals. A permitted device may transfer any type of digitized information to a repository 10.

There are multiple different ways that a permitted device may add information to a repository 10. First, a subject may submit information into the repository 10 by transferring data, such as a file, on an electronic device. A subject may also enter information into the repository 10 using a script or software. In that embodiment, the subject would permit or program software to transfer data into the repository 10. A subject carrying a device such as a smartphone may permit the device's software to enter the device's location information into the repository 10. The device may enter location information on a periodic basis, e.g., daily, weekly, monthly, or even hourly or in real-time. The subject's device may also transfer other information on a periodic basis, such as emails or voice recordings.

The data subject may wish to record and enter their thoughts, experiences, observations, goals, hopes, and desires into the repository 10. The subject may do this in more than one way. For example, a subject may draft a letter, an email, a note, or may even hand write, or print and scan a document containing their thoughts, experiences, etc., and enter that into the repository 10. A subject may also speak into a device that would enter the recorded voice into the repository 10.

Separately, a subject may wish to record and enter information about the subject's body, such as biometric data 22. Such biometric data 22 may include the subject's heart rate, body temperature, blood pressure, skin color, eye color, height or weight, and calculated data based on direct measurements, such as body mass index ("BMI") 23. Other examples of biometric data 22 may include measurements of skin conductance, and electrical signals that the brain generated. Importantly, this information may be relevant to, or indicative of, the subject's experiences in a particular place or time. As an example, subjects having a different height may experience the world in a different manner than others. As another example, frequent changes in skin conductance and heart rate, or other somatic responses, may also be relevant to, or indicative of, what a subject is experiencing, e.g., in an emergency situation. This data may be entered into the repository 10, and may be entered in real time. In other embodiments, a subject may wish to record and enter the subject's biographical information, for example, place of birth, former residences, and schools attended. Again, this information may be relevant to, or indicative of, the subject's experiences in a particular place or time.

A subject may wish to record information about the subject's nervous system, and brain, and enter that information into a repository. Such information would show nervous system and brain function related to the way a person perceives and decides. Such function changes based on stimuli, and therefore may be measured by exposing the subject to stimuli. A subject may obtain this data by a number of invasive and non-invasive instruments known to a person of ordinary skill. Such instruments include electroencephalogram ("EEG"), functional magnetic resonance imaging ("fMRI"), functional near-infrared spectroscopy ("fNIRS"), and a variety of implantable electrodes in the brain and other areas of the nervous system. The data obtained through such instruments include electroencephalograph signals, neural signals, single-unit recordings, local field potentials, sensory and motor signals, and self-reports on cognitive and emotional states. In one embodiment, a subject would receive surgery to implant electrodes in selected brain regions. The subject may select a variety of brain regions and structures to provide a diversity of data. Additionally, the subject may decide whether to select a specific type of implant material that may not hinder data collection from other instruments (e.g., selecting magnetic resonance imaging ("MRI")-compatible materials).

In one embodiment, a subject may engage in a series of virtual reality sessions to create a life-like experience. In the example of a nursing student, the student would be exposed to virtual reality ("VR") where the student must engage with, and react to, a traumatic event. Any combination of instruments, whether invasive or non-invasive, would collect data on brain activity. The data would be analyzed for features relevant to that subject. For example, analysis may include whether and which brain regions respond in what ways. When the stimulus is a traumatic event, if the hippocampus activates less than a typical person or student similarly exposed, then that may indicate that the person may be more reliable in an emergency situation. If the hippocampus activates more in a traumatic situation, then that may indicate that the person may suffer more fear than typical during an emergency situation. Aspects of the present disclosure contemplate analysis of other brain functions, including proxies of other bodily functions such as oxygen flow to certain portions of the brain, release of adrenalin, heart rate, and breathing.

In other embodiments, the subject may engage in real-life experiences with invasive instruments (other than fMRI), or non-invasive instruments, or combinations of both. As an example, a nursing student attending a surgery may have a combination of invasive and non-invasive instruments recording the student's brain function during the surgery. Similar to a VR stimulus, the data from the instruments may be analyzed to determine whether and which brain regions respond in what ways, and especially how that may be relevant and helpful to the subject.

A typical nervous system or brain instrument generates a massive amount of data. For example, a single unit recording, even with down sampling and data compression may generate one terabyte of data per hour (30 kilohertz (KHz) sampling and 60 channels). In most embodiments, the data is processed in real time so that all of the raw data need not be stored. In a preferred embodiment, the data subject may choose whether to enter the resulting analysis into the repository. The analysis may contain a summary of the raw data. Such analysis may show, e.g., which brain regions activated in which way in response to what stimulus. Once the data is entered into the repository, the data subject may further be able to compare the analysis with other data. For example, the subject may be able to compare the analysis with sensory inputs or first-person accounts corresponding to certain changes in the brain activity. Alternatively, the subject may be able to compare the analysis with other nervous system or brain data analyses obtained from similar or different stimuli.

In other embodiments, the subject may also capture information external to the subject, e.g., information arising from anywhere in the surrounding environment, at any time. The subject may enter this information into the repository 10. Typically, the subject would do this by using a permitted device to record the audio or video of an event, and then enter that into a repository 10 either in a real-time stream, or by entering the information soon after the event occurred. The event may be anything that the subject may be experiencing in real time. For example, events may be the activity of learning something new, including as a student or trainee, watching a video, attending a political event, or exercising.

In some aspects of the present disclosure, the device itself would enter information about the event into the repository 10 in real time. Other aspects may require the information to be transmitted through a separate device, e.g., because the device lacks a built-in network connection to access the repository 10. Recorded data entered into the repository 10 may include multiple different types of information. For example, a data subject who is a person visiting a city and walking down a street may record that event in a way that captured the audio-visual information, temperature, and humidity in the city—all as part of the same event. Generally, the information about the event would also include information such as the time and location. In one example, a student at a school would carry a permitted device at all times while attending school, such as the student's personal smartphone. The device may contain a special application to facilitate entering of event information into a repository 10 located on the Internet, or to a repository 10 located at the school. In preferred embodiments, regardless of the location of the repository 10, the student would have control over the repository 10, and would be the only individual to permit others to access it. In other embodiments, students may grant permission to school administrators and educators to access the repository 10.

The student may enable a certain feature on the device when participating in a learning activity. For example, a nursing student learning to assist a doctor with a surgery may cause the device to begin recording during the learning activity. The device may capture environmental conditions, including the noises of the surgery, instructions the surgeon provides, visual information about the operating room, the temperature of the operating room, and the time of the surgery. The device may also receive information from the building itself, or information from devices in the operating room, e.g., the room may be equipped with a thermometer that may transmit the room temperature to the student's device. All or any portion of this information may be entered into the repository 10.

In this example, the student's device would enter information about the learning activity into the repository 10. The student may also choose to record their thoughts and reflections about the learning activity to enter into the repository 10. The student may record their thoughts in any number of ways, including a voice recording or in a written document. The student may enter the recording into the repository 10. In preferred embodiments, a student would control all content within the repository 10, and including features the repository 10 may have. Typically, the repository 10 would group the information about the learning activity with the information about the student's thoughts or reflections about the learning activity. In this same manner, a student may enter multiple different portions of information, each relating to the same event, into the repository 10. Aspects of the present disclosure contemplate methods of grouping such information together, including software analysis of patterns between the information (e.g., different information sources having similar time and date stamps, or having similar words captured by video or audio), manual file tagging by the subject or someone with knowledge about an event, and relational database technology. In still other embodiments, an individual or software may write, add, or otherwise include a description about the information and/or event (e.g., metadata).

In other examples, an institution or a surgical team may implement multiple devices, including devices associated with individuals participating in an event, and with machines operating during the event. Collectively, the devices would capture all conditions within one or more institutional spaces related to the event, e.g., a surgery conducted in an operating room, and the nurse's station outside of the operating room. The devices would collect the audio and video of the space or spaces, from multiple different frames of reference, and additionally would collect the data received by the machines within the space or spaces, e.g., temperatures, pressures, lighting, electrical current and voltage, and machinery or machinery component activations. The institution may collect and store such data in its own institutional repository. Alternatively, each member of the surgical team may contribute their data and their data may be linked and accessible via metadata.

Figure 2:
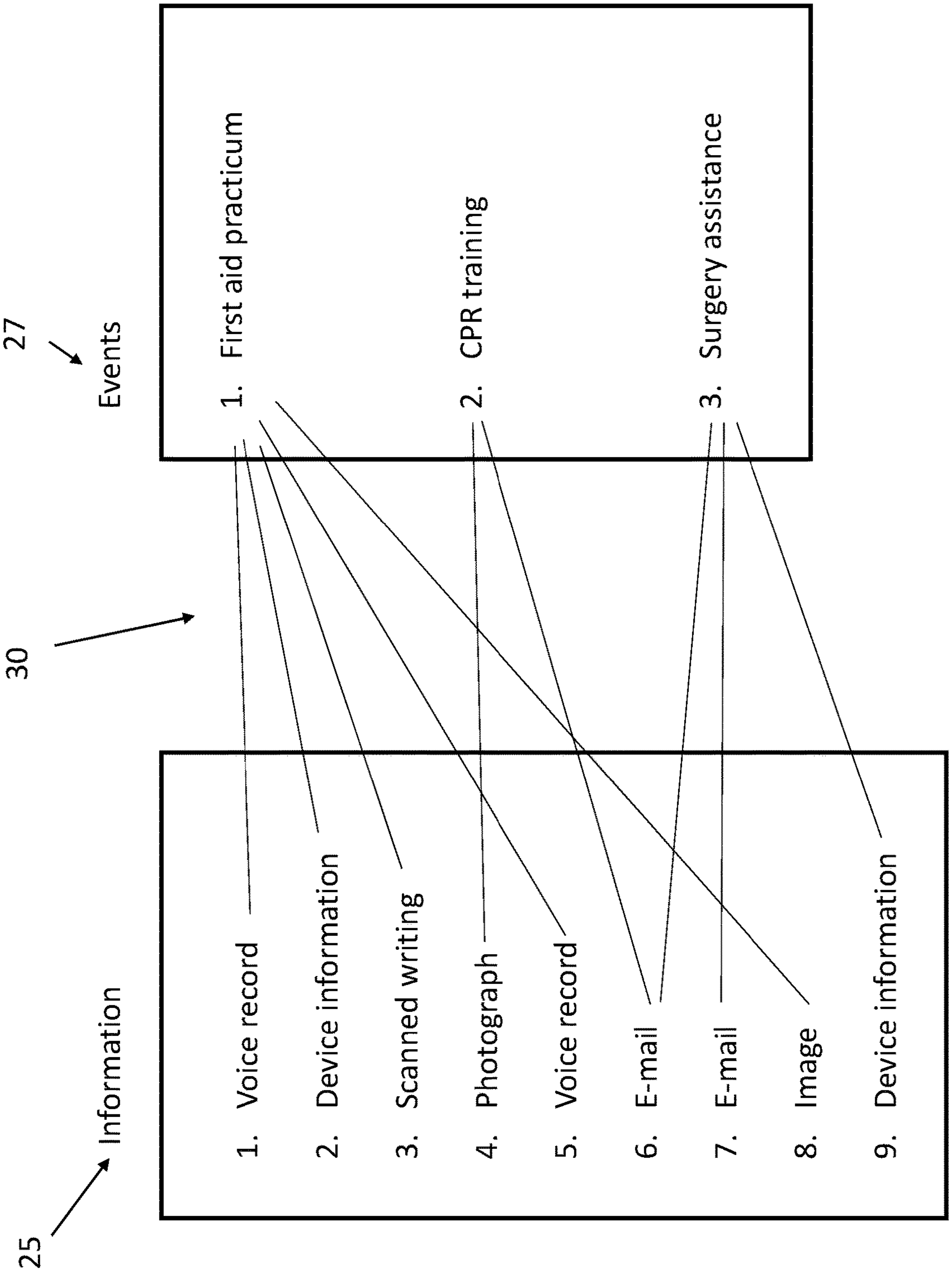
FIG. 2 is a block diagram illustrating an embodiment of various types and sources of information and metadata that are stored on a repository, according to various aspects of the present disclosure.

In the example of the student engaging in a learning activity, there may be multiple sources of information that are organized as relating to the same event within a repository 10. In a typical embodiment, metadata would link the information and event(s). One such embodiment is depicted in FIG. 2. FIG. 2 is a block diagram illustrating various types and sources of information 25 that are stored on a repository 10. Each portion of information 25 is connected (via a connection 30) to one or more events 27. The connection 30 is a form of metadata linking information 25 to an event 27. FIG. 2 shows an embodiment for utilizing the repository 10 in a medical training scenario; however, the present disclosure is not limited to such a scenario.

A repository controller is an administrator of the repository 10. The repository controller may select an appropriate organizational structure, including metadata, for events 27 and information 25. The repository controller may or may not be the subject. In preferred embodiments, the data subject is the only repository controller. In other embodiments, the controller may be an employer, or an institutional administrator, or the controller may be software. In a typical embodiment, the controller would select an organizational structure that corresponds with an accurate depiction of how a real-life event actually occurred. For example, a data subject, who is the only controller, may wish to document a personal event, e.g., a family picnic. In preferred embodiments, the controller would select an organizational structure for photographs of the picnic that accurately represent the date, time, and location of when and how the family picnic actually occurred.

In other embodiments, the controller may select an organization that either partially, or falsely, corresponds with reality. This might occur for entertainment, learning, or training purposes, or because of a unique feature of how the individual behaves. By way of example, a data subject who is the controller may select an organizational structure for a series of personal photographs that ostensibly depict the individual in a different time period, or location, than the data subject was actually present in when the photographs were taken. The controller may select such an organizational structure to advance an entertainment, learning, or training goal, or simply for personal reasons.

In preferred embodiments, the data subject is the only repository controller. In other embodiments, a data subject assigns or permits a controller that is customized software for school administration. One or more permitted devices would enter information 25 about a particular event 27 that the student participated into a repository 10 corresponding to that student. The controller would assign the information 25 in a way that accurately conveys the student's experiences. In a typical embodiment, the controller would use metadata to accomplish this. For example, the repository 10 may contain multiple portions of information 25 about a student who attended a learning activity about a surgery. In preferred embodiments, the controller is the data subject, and would assign those portions of information 25 to metadata accurately describing the training activity. The metadata may describe the training activity by the institution's name for that activity. In preferred embodiments, the metadata is a reflection of the student's experience (e.g., reflecting details about the student's experiences during the activity). In other embodiments, the institution would be the controller and would assign those portions of information 25 to metadata accurately describing the training activity. In such embodiments, a government or institution may authenticate the data subject's personal information from the government or institution's perspective.

In preferred embodiments, the subject would solely control the repository. For example, a medical professional may enter information 25 into a repository 10 in connection with an actual surgery. The medical professional may organize the data, including metadata, to reflect the actual surgery. Information that the medical professional enters may include their role in the surgery, including other information corroborating the role, e.g., an image of the surgical schedule identifying the medical professional, an image of the badge of the professional on the day(s) of the surgery (with time and location information), a parking receipt reflecting the medical professional parked at the location where the surgery took place, and an image of the surgical team before and after the surgery. The professional may further include private and contemporaneous thoughts and reflections about the surgery. For example, the professional may enter personal information about their emotions before, during, or after the surgery, including based on the patient's outcome from the surgery.

In other embodiments, there may be more than one repository controller. In those instances, a controller may have access to only selected information. For example, a subject who is a repository controller may have access to all of the information on the repository. However, within the same repository, a non-subject repository controller may only have access to certain portions of the information on the repository. In preferred embodiments, the data subject is a controller, and may solely grant or restrict access rights to other repository controllers.

In one embodiment, a student is a data subject with total control over a repository. The student decides to grant to an institutional administrator limited rights as another repository controller. In this embodiment, the data subject controller may choose certain information to enter into the repository. However, the limited rights of the institutional administrator require it to propose certain information to enter into the repository. After proposing the information, the data subject may choose to select or reject the information to be added into the repository. In some embodiments, a data subject need not expressly reject the information. However, if the data subject does not select the information to be added within a certain period of time, then the information may not be added into the repository.

Within this embodiment, a student may wish to enter certain information for which the student would grant access to the administrator. However, the student may wish to enter other information into the repository that the student would not wish the administrator to access, and so would forbid access. In this example, the student attending a training session may enter personal information about their performance during the session into the repository. The student may designate that this information would be available to an administrator. The administrator may also enter different information about the student's performance during the session. Separately, the student may wish to enter sensitive personal information into the repository. This may be information that the student would not wish anyone else to have access to, such as personal thoughts or feelings about the training session.

Figure 3:
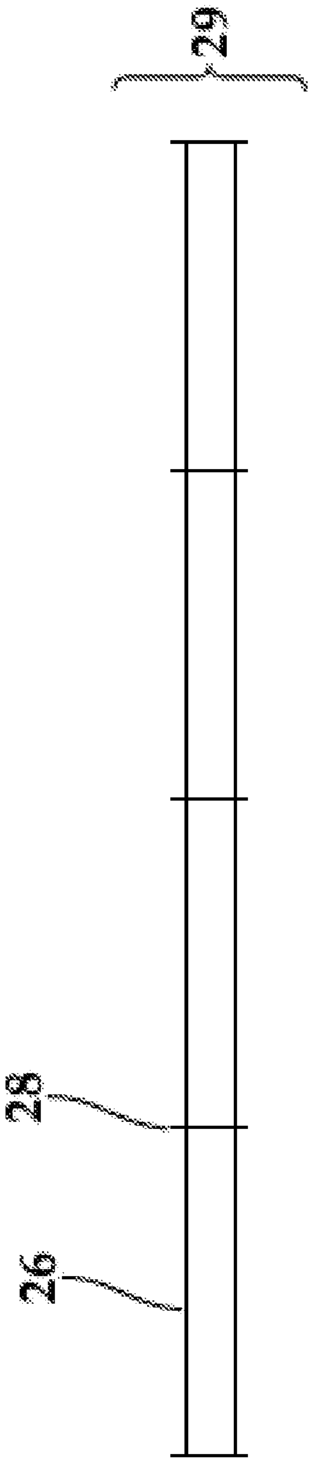
FIG. 3 shows an embodiment of an electronic ledger storage system, according to various aspects of the present disclosure.

Aspects of the present disclosure contemplate utilizing a persistent database. The persistent database is a data structure where all versions of data are recorded, even if the data is changed. In this manner, an act to change the data may affect the data, and cause the data to be different. However, the database retains the original version of the data before the act occurred. If multiple acts, or changes to the data occur, then each version of the data may be retained. Further, given the correct permissions, any versions of the data may be accessed. In this manner, any data is persistent and stored. One type of persistent database is a blockchain network such as Bitcoin. In that network, certain users may act to cause the data to change (e.g., transacting bitcoin from one account to another), and may incur a cost to perform the act. The network, however, may retain the data before the act causing the change, and after the act has caused the change FIG. 3 depicts an embodiment of an electronic ledger storage system 29. An electronic ledger storage system 29 is a type of persistent database. Any of the information contained in repository 10 may be entered into the electronic ledger storage system 29. In most embodiments, the electronic ledger is based on blockchain technology. A ledger controller would have access to a cryptographic key that may cause or permit a transaction to occur on the blockchain (e.g., to enter information into the blockchain). In preferred embodiments, the data subject is the only ledger controller and the only repository controller. However, in other embodiments, the ledger controller may be the same as or different than the subject, or the same or different as the repository controller. Typically, the ledger controller would be a single individual (who is the data subject), but the ledger controller may also be more than one person or software. The data subject may also provide that technology (such as AI software) may have the same rights as the ledger controller and repository controller after the data subject is deceased. In this circumstance, the technology would be permanently connected to the key.

One or more transactions 26, or entering of information, may correspond to one or more selected events and/or selected portions of information. In some embodiments, each transaction 26 is a single selected portion of information. In other embodiments, more than one selected portion of information is encoded in a single transaction 26. In still other embodiments, all information corresponding to one or more selected pieces of metadata 28 is encoded in a single transaction 26. In other embodiments, all information corresponding to one or more selected pieces of metadata is encoded in a single transaction, but without the metadata. A selected piece of metadata may correspond to a certain time or period of time, or may correspond to a certain event or multiple events.

In a typical embodiment, one electronic ledger storage system 29 may correspond to one repository 10. However, there may be more information in the repository 10 than on the electronic ledger storage system 29. For example, information about an experience may be entered into a repository. However, the ledger controller may not wish to encode every part of that information. In an academic example, the student is the ledger controller, and may only wish to encode the portions of an activity that demonstrate that the student achieved the educational goals of the activity. A data subject who is the ledger controller may have access to one or more repositories, or to one or more storage systems, e.g., as repository and ledger controllers. In that instance, the data subject may select information from more than one repository 10 to be encoded into a single electronic ledger storage system 29. Alternatively, the data subject may select information from a single repository 10 to be encoded into more than one electronic ledger storage system 29. In certain embodiments, the data subject may have access to one or more repositories containing others' reflections about the data subject, e.g., one or more individual's interpretations of the data subject's actions. The data subject may choose to encode any such reflections into one or more storage systems. In a typical embodiment, a student is the data subject who is also the only ledger controller, and may select an educator's video-recorded recommendation or assessment about the student to encode into the student's storage system.

In a different example, a ledger controller may include an educational administrator. That controller may wish to add a student populations' shared experience (such as a lecture) into all of the students' storage systems. The ledger controller may need to access only a single repository to accomplish this. Accordingly, efficiency may be achieved with encoding experiences shared by more than one student (such as a lecture contained on one repository) into multiple storage systems (each corresponding to a different student who shared the same experience).

In certain embodiments, a ledger controller may have access to more than one cryptographic key. In preferred embodiments, the data subject is the only ledger controller and has sole access to all keys. After the data subject is deceased, the data subject's pre-selected technology (such as a particular AI) would have the same rights to the keys as the data subject had when alive—and the technology would be permanently connected to the keys. In those embodiments, the ledger controller may select which key to use for which portion of information, or any other data, that would be encoded into a ledger storage system. In some embodiments, there may be more than one ledger controller. Each ledger controller may have a unique cryptographic key, each of which would permit encoding into a ledger storage system. In other embodiments, a ledger controller may have one or more of the same keys as other ledger controllers, and one or more unique keys.

In one embodiment, the selected portions of information encoded together in a single transaction 26 into an electronic ledger storage system 29 may correspond to a single activity in which a person participates. For example, in the educational context, all information on a repository from a student attending a single class or training session would be encoded in a single transaction 26 on an electronic ledger storage system. In a preferred embodiment, the student is the sole repository controller and sole ledger controller. In that example, metadata (via connection 30) may correspond to the class or training event 27, and information 25 related to that class or training event 27. All of the information 25 and the event 27 may be encoded through a single transaction 26 in a ledger storage system 29. In other embodiments, for convenience, a student may permit an administrator of the educational institution to be a ledger controller and a repository controller. In such embodiments, a government or institution may authenticate the data subject's information from the government's or institution's perspective, including documents and information issued by the government or the institution. In such an embodiment, the student may also provide the administrator with a unique key. Typically, the student would retain full rights and only provide the administrator with limited rights. Thus, the student would be required to authorize any transaction 26 proposed by the administrator.

The information 25 contained on the electronic ledger storage system 29 may be encoded in various ways. In one embodiment, the information 25 is encoded in a known, publicly accessible format, e.g., a portion of information that is a single photo 16 may be encoded in a publicly accessible .jpg file. In other embodiments, information 25 may be encoded on the electronic ledger storage system 29 in a non-public format that would require a key to decode. A ledger controller may select a particular code for a particular transaction 26, e.g., public or non-public. There may also be multiple codes used in a transaction. For example, in the instance where a student records personal observations and experiences about a class, the student may wish for that information 25 to be on the electronic ledger storage system 29, but not available publicly. In that case, the student may be the only individual who has access to the code for that information 25. The remaining information 25 about the transaction 26 concerning the student's experiences in the class may be public, or accessible to others through a semi-private key.

In preferred embodiments, the data subject is the sole ledger controller, and may retain control over whether to make any information public, or private, or semi-private. In some embodiments, a data subject may wish to select portions of identity to present to different categories of people. For example, the individual may wish to present to certain categories of people, or conceal from certain categories of people, many types of information related to identity, including information related to family, business, gender, sexual orientation, political opinion, and faith. The individual may encode all such information accordingly.

In certain embodiments, an individual human may be the sole ledger controller. The individual would select one code known only to that individual (first code), one code that may be shared with others (second code), and one code that is public (third code). In such embodiments, if the individual only uses the first code, then the individual is the only person who may encode information into the storage system, and the only person who may access such information. If the individual uses the second code, then other individuals whom the individual selects may access the information. If the individual uses the third code, then anyone may access the information on the electronic ledger storage system 29.

An individual may use the electronic ledger storage system 29 to encode a variety of unique life experiences. Such experiences may include that individual's daily activities, important life events, learning activities, travel experiences, work experiences, and recreational experiences. The individual may encode certain portions of information 25 and/or events 27 with different restrictions. For example, a student may use the third code to make key learning experiences that demonstrate that the student has learned certain skills accessible to the public. Alongside those experiences, the student may choose to use the first code to make personal reflections about the learning experience private. In one embodiment, a student may make a set of activities publicly accessible demonstrating that the student successfully assisted a doctor during a surgery. The student may make their reflections about the experience, such as doubts or surprises, private. Still other portions of the experience may be made semi-private, e.g., a student may use the second code to make information about a particular experience during the surgery available to fellow students. The student may do this for a number of reasons, including that the student believes it would help other fellow students learn the skill better. Students may also make the experiences private, or semi-private, with a number of other limitations. For example, a student may place a time limitation on a private experience so that after a certain time period, the experience may become public, or semi-private. Alternatively, a student may place a time limitation on a semi-private experience so that after a certain number of years, the experience may become private, or public. Similarly, a student may place a time limitation on a public experience so that after a certain number of years, the experience may become private, or semi-private.

In a preferred embodiment, a controller may have implemented an organization scheme to categorize experiences. A data subject would be able to search for, or filter experiences, by category, and view them. In a preferred embodiment, an AI avatar of the individuals who actually provided the experiences would be able to convey those experiences to the data subject. For example, a less experienced nurse may suffer a traumatic event at work, and may wish to understand how others experienced a similar event. The nurse may select a category that may closely correspond to the same type of suffered trauma. Then, the less experienced nurse may understand how others, through AI avatars, experienced that same event. In one example, an emergency room ("ER") nurse may lose a patient during an early morning surgery during the nurse's first year on the job at a midwestern hospital. The nurse may create a filter, or search, to provide a category of other accessible experiences (publicly available, or semi-private and available to the nurse) that may align with the nurse's experience. Within the accessible experiences, the nurse may locate experiences that align with the nurse's experiences based on how helpful the nurse perceives such accessible experiences to be. For example, the nurse may only need to locate experiences by other nurses or doctors who lost a patient (the specific type of medicine, the time of day, and the region may not matter). On the other hand, the nurse may also attempt to locate experiences that match more criteria of a filter or search, e.g., finding publicly available or semi-private experiences by midwestern ER nurses who lost a patient in early morning surgery during their first year. The nurse may select the appropriate criteria for the nurse's needs given the context.

Once the experiences are located, the nurse may be able to communicate with AI avatars concerning the experiences. Importantly, the experiences may be those of deceased individuals. For example, the experiences may be those of pioneers in the field of medicine generally, or now-deceased older nurses or doctors. The experiences may also be those of colleagues, or of individuals who are not in the medical profession but suffered a traumatic event.

Figure 4:
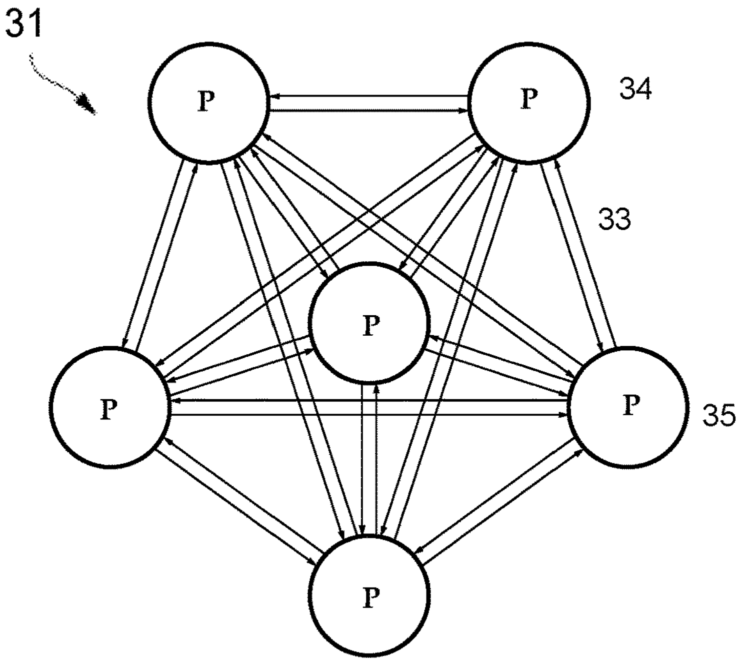
FIG. 4 shows an embodiment of a peer-to-peer network to accommodate a ledger, according to various aspects of the present disclosure.

FIG. 4 depicts an embodiment of a network, e.g., a peer-to-peer transaction system 31. FIG. 4 depicts one direct connection 33 between machines 34, 35 permitting them to communicate with each other, or to pass information between other machines on the peer-to-peer transaction system 31. One purpose of the peer-to-peer transaction system 31 is to verify that the ledger controller is legitimate. This is accomplished through computers on the peer-to-peer transaction system 31 performing a mathematical proof-of-work algorithm. In one embodiment, a ledger controller may encode information into the ledger using a legitimate key, and submit the ledger to a machine 34 on the peer-to-peer transaction system 31. The machine 34 may distribute a copy of the complete ledger, including the new addition, to other machines 35 on the peer-to-peer transaction system 31. In parallel, the machine 34 and other machines 35 may confirm, by mathematical proof of work, that the ledger controller used the correct key to add the information. At that point, the machines 34, 35 may communicate the proof of work results to each other, and to other machines on the peer-to-peer transaction system 31, thereby verifying the new information on the ledger. In this manner, machines 34, 35 may mathematically authenticate the entering of new information into the ledger.

In one embodiment, only a single machine may confirm the proof of work. For example, if the peer-to-peer transaction system 31 is based in an institution or a government, more than one machine may not be needed for a full peer-to-peer transaction system 31 because the institution or the government has greater control over how cryptographic keys are issued. In such an example, the authentication may be mathematical, or may simply be based on the institution's or government's confirmation that the information is authentic. Regardless of the key used, the institution or the government may confirm that a transcript contains accurate information and is therefore authentic. In another embodiment, the machines may be located anywhere in the world, and anyone may own them. Any ledger controller may access the peer-to-peer transaction system 31 at any time, and submit a new entry for a ledger. In this case, a certain number of machines may need to confirm the ledger entry before it is fully distributed to the rest of the peer-to-peer transaction system 31. Individual machines 34, 35 and the peer-to-peer transaction system 31 may reject any removal or attempted removal of information from a ledger.

Aspects of the present disclosure contemplate other blockchain and cryptographic communication and storage protocols understood by a person of ordinary skill in the art.

Figure 5:
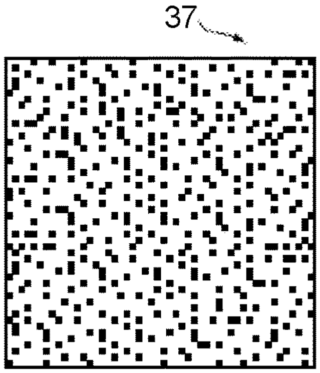
FIG. 5 shows an embodiment of a unique, eternal identifier, according to various aspects of the present disclosure.

FIG. 5 depicts an embodiment of a visual code 37. The visual code 37 contains information linking the visual code 37 to a certain electronic ledger storage system 29. In preferred embodiments, the electronic ledger storage system 29 may reflect a single human identity. Further, the electronic ledger storage system 29 may be accessible on a distributed network, rendering the electronic ledger storage system 29 always available, and effectively eternal. The visual code 37 may be comprised of pixelated information that is uniquely arranged. In one embodiment, the visual code 37 may have over a trillion possible unique combinations. In other embodiments, the visual code 37 may have over a quadrillion possible unique combinations. In additional embodiments, the visual code 37 may have a number of combinations greater than 10^100, which is greater than the estimated number of atoms in the universe. In this sense, the code is "eternal" and also "unique" in that there are a sufficient number of codes for every subject now or in the future to obtain, especially in the preferred embodiment where a subject is a single human, and no code is assigned to more than one human.

The visual code 37 is accessible and readable by cameras built into devices, e.g., a smartphone or smart glasses. In a preferred embodiment of the present disclosure, a data subject is a single individual and the data subject may be linked to a repository 10, an electronic ledger storage system 29, an AI avatar, and a visual code 37. In some embodiments, an issuing authority may create and store the visual code 37 into a ledger storage system itself. In that instance, the visual code 37 may never be separated from a particular ledger storage system. An issuing authority may also issue a non-fungible token that is also linked to a particular ledger storage system. Others accessing the electronic ledger storage system 29 may confirm that the information in the electronic ledger storage system 29 is associated with a particular subject, and a particular visual code 37, an AI avatar, and a particular token. An issuing authority may be an institution, an individual, or any organization. In certain embodiments, each subject may be an issuing authority for that subject's visual code 37 and non-fungible token.

A camera accessing the visual code 37 may access a database that links the unique combination from the visual code 37 to at least the electronic ledger storage system 29. In other embodiments, the camera accessing the visual code 37 may link the database to a repository 10 and the electronic ledger storage system 29. Depending on the access permissions and availability of codes, the individual now linked through the visual code 37 may view, change, or add into the repository 10, or may view or add to the electronic ledger storage system 29. The visual code 37 is an identification of the individual and corresponds to a repository and blockchain reflecting a single individual's identity and identifiers. Typically, the repository contains a set of information that may or may not be added to an electronic ledger storage system 29. In preferred embodiments where the data subject is the individual, most of the information in a repository is experiential to an individual's identity. An individual's repository would typically contain more information than the electronic ledger storage system 29.

Figure 6:
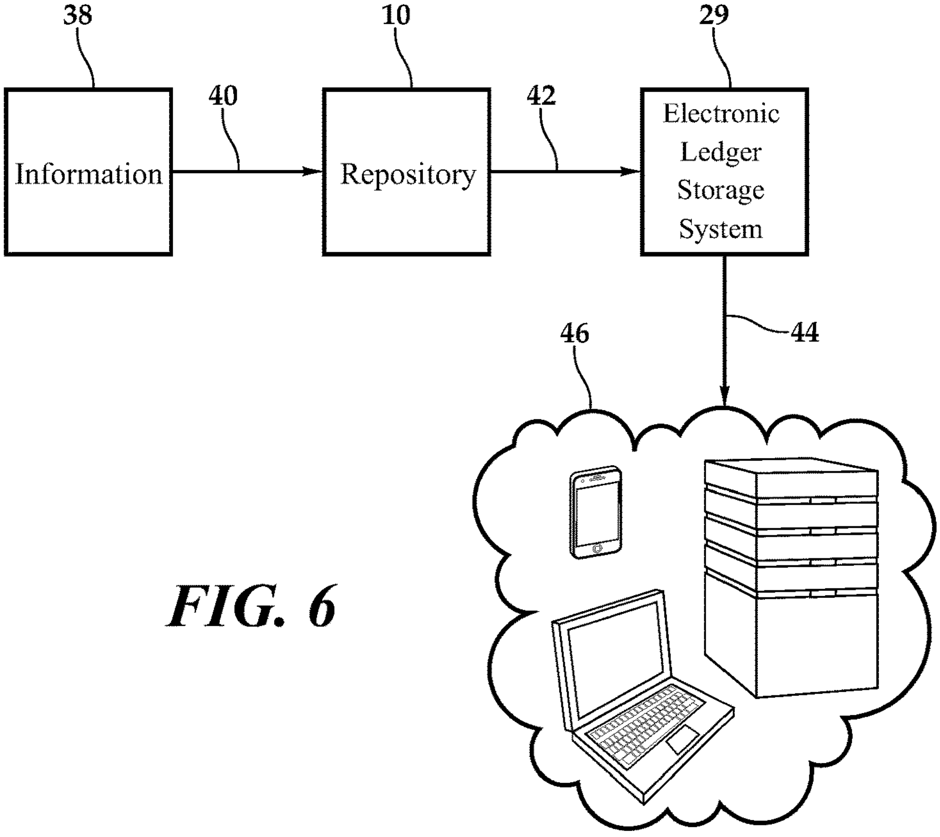
FIG. 6 is a flow chart of an embodiment of a personal identity storage and transmission system.

FIG. 6 is a flow chart illustrating an embodiment of a method including transmitting information added to an electronic ledger storage system to a network 46, according to various aspects of the present disclosure. In this embodiment, a data subject is both the repository controller and the ledger controller. The subject obtains information 38, e.g., from a permitted device such as the subject's smartphone, and enters 40 that information 38 into the repository 10. The subject organizes the data on the repository 10 in a desired manner. Then, the subject selects certain information 38 from the repository 10, utilizes a unique key to encode the information 38 now contained in the repository 10, and encodes 42 that information into the electronic ledger storage system 29. The subject then transmits 44 the new information added to the electronic ledger storage system 29 to a network 46. In this embodiment, the network 46 would already have an existing copy of the electronic ledger storage system 29 (e.g., containing the subject's previously encoded information). The network 46 may confirm the subject's addition to the electronic ledger storage system 29. The network 46 may then circulate the subject's addition to the between computers on the network 46. Alternatively, the network 46 may circulate the complete electronic ledger storage system 29, including the subject's addition (and containing the subject's previously encoded information), between computers on the network 46.

A different embodiment of a system embodying the present disclosure may improve efficiency of a blockchain network. In this embodiment, rather than encoding information 38 in a repository 10 (e.g., a video file of an experience) to the electronic ledger storage system 29, the data subject would utilize a unique key to encode reference metadata into the electronic ledger storage system 29 that refers back to a file in the repository 10. That reference metadata would be encoded into the electronic ledger storage system 29. Anyone accessing the electronic ledger storage system 29 would then rely upon and use the metadata to access the information 38 (such as the video file). Access to the repository 10 would be provided if the reference metadata is accurately decoded and provided to a server containing files on the repository 10. In this embodiment, both the visual code 37 and the blockchain serve as the identification. Only the repository 10 would reflect the individual's identity.

Figure 7:
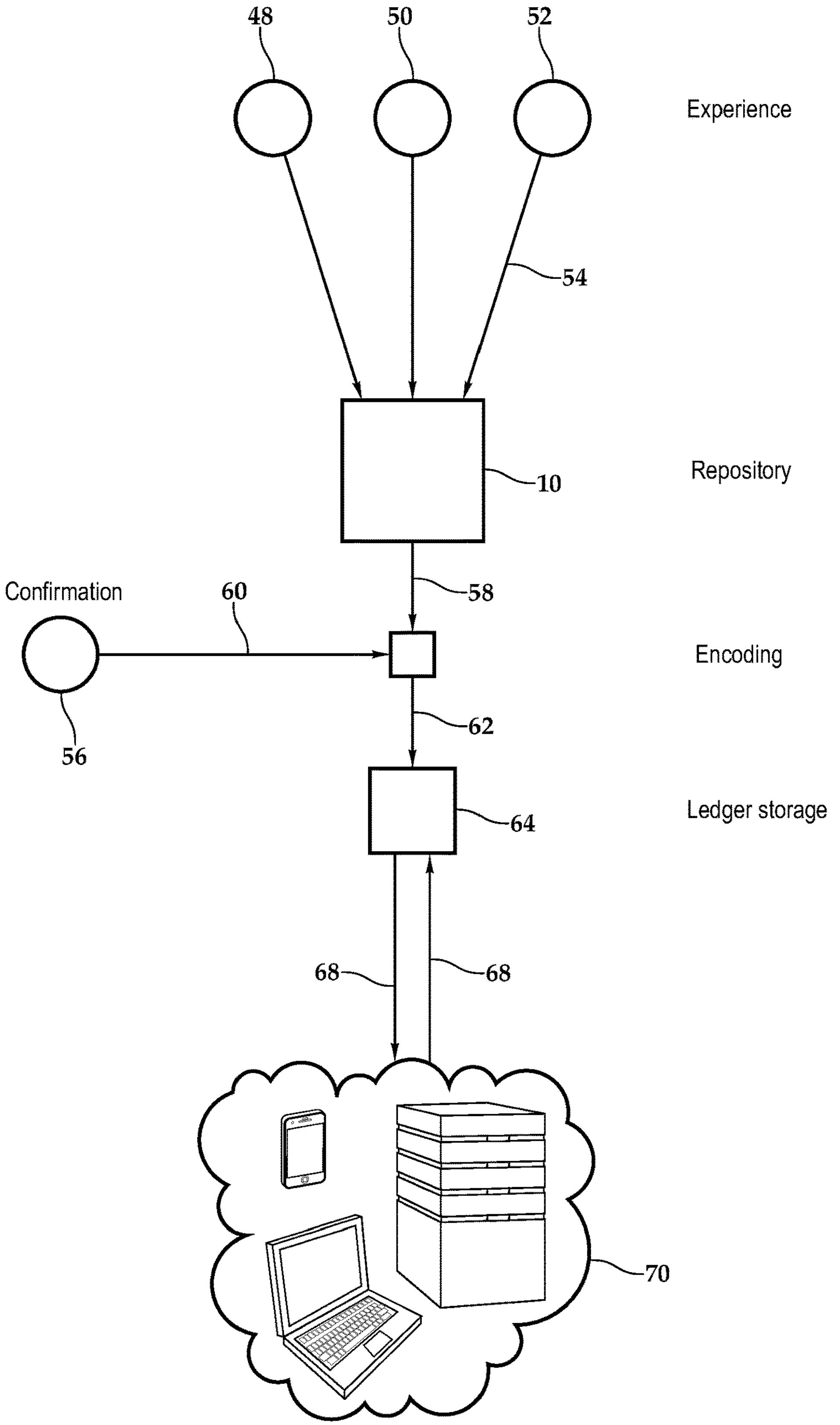
FIG. 7 is a flow chart illustrating an embodiment of a repository storage system or method, including entering, encoding, and storing pieces of information, by multiple ledger controllers with varied access permissions, according to various aspects of the present disclosure.

FIG. 7 is a flow chart illustrating an embodiment of a method including accessing, entering, encoding, and storing information, by multiple ledger controllers with varied access permissions, according to various aspects of the present disclosure. A data subject may be a student who has certain experiences that are recorded as portions of information 48, 50, 52. A first portion of information 48 may be an image of the student participating in the activity. A second portion of information 50 may be a written report from an instructor of the activity about the student's performance. A third portion of information 52 may be the student's private voice recording conveying the student's thoughts, feelings, hopes, and desires in connection with the activity. The instructor may enter 54 the image 48 and report 50 into the repository 10. The student may enter 54 the private voice recording 52 into the repository 10, and in doing so, may set access permissions for whom (if anyone other than the student) may access that voice recording 52.

In this embodiment, the student is also a ledger controller 56. The student selects certain information from the repository 10, and chooses the selected information to encode into a ledger storage system. In this embodiment, the student chooses two portions of information 48, 52 to encode into a blockchain ledger storage system 64. An administrator of the institution is also a ledger controller and selects information 50 to encode into the blockchain ledger storage system 64. In a preferred embodiment, the student is the only ledger controller 56, and the student reviews the information 48, 50, 52 prior to encoding such information into the blockchain ledger storage system 64. The student may desire to do this to conduct a final check before any information is encoded into the blockchain ledger storage system 64 where the information may be provided to others, or to the public. This final review may be useful to the student so that the student may fully evaluate where and how the information 48, 50, 52 may be advantageous, or disadvantageous to the ledger's reflection of the student's identity.

In a different embodiment, a separate actor 56 (who in some embodiments may be an individual, a group, a machine, or software), who is also a ledger controller 56, reviews the information 48, 50, 52 prior to encoding it into the blockchain ledger storage system 64. The ledger controller 56 may not be able to review the information 52 if the student chose not to make that information accessible to the public. Further, because the student permitted another ledger controller 56, typically the student would provide for limitations of that ledger controller's capabilities. For example, a student may provide that a separate ledger controller 56 has no rights to encode certain categories of information, e.g., an instructor's opinion of the student, into the ledger. Only the student (acting as the other, or primary ledger controller) may authorize that information to be viewed by anyone else, including other ledger controllers 56, and only the student may authorize that the information be added to a ledger. Typically, the student would permit an institutional ledger controller to encode facts that cannot be changed and are typically provided by the institution, such as grades, a transcript, and a diploma. In some embodiments, the ledger controller 56 may be able to view metadata about information 52 that the student or institution added. The actor 56, which may be an individual or software, reviews information 48, 50 and confirms its validity on the institution's behalf. The actor 56 inserts metadata 60 reflecting the same into portions of information 48, 50. At that point, the information 48, 50, 52 is encoded in one or more transactions 62 into a blockchain ledger storage system 64. In one embodiment, the student may have encoded information 52 using a private cryptographic key, meaning that only that student would have access to that information. Information 48 may be public, and information 50 may be semi-public. The institution transfers 68 the addition(s) to the blockchain ledger storage system to a network 70. The network 70 may be a virtual peer-to-peer transaction system 31 accessible by the Internet. The network 70 mathematically confirms the addition(s) to the blockchain ledger storage system 64. The network 70 may transmit 68 the new version of the blockchain ledger storage system 64 (e.g., incorporating the addition(s)) back to the machine that transmitted the new addition(s). At this point, information 48, 50, 52 is added to the blockchain ledger storage system 64, as is certain metadata.

In a separate embodiment also depicted in FIG. 7, a data subject may be the ledger controller 56. The ledger controller 56 is an individual who wishes to verify certain identifiers, e.g., information 48, 50, 52 that may be contained in documentation that may be relied upon in a government's identifier management scheme. The documentation 48, 50, 52 may include the following: a driver's license, passport, student identification, credit card, employment ID, professional license, social security card, state ID card, military ID card, permanent resident alien card, birth certificate, marriage license, department of defense card, health card, insurance card, press pass, hunting license, library card, pilot's license, firearm permit, medical *cannabis* card, automobile insurance card, voter registration card, certificate of degree of human blood card, Certificate of Indian Status card, I-872 American Indian Card, Indian Health Services card, Tribal Enrollment document, and Tribal Membership card. An individual who has this documentation may scan and upload any of these documents, and enter 54 them into the repository 10. Each uploaded document may have metadata that is stored alongside the uploaded document in the repository 10.

Such metadata may identify an appropriate ledger controller 56 for the document, e.g., a ledger controller may be the organization or office that issued the documentation, or an authorized contractor. The ledger controller 56 may receive an alert that a certain type of documentation has been uploaded or that an individual wishes the ledger controller 56 to confirm or validate a type of documentation. In this embodiment, there may be one or more ledger controllers 56, including one for each type of documentation. Once the appropriate ledger controller 56 for each piece of documentation reviews the corresponding documentation 48, 50, or 52, the ledger controller may confirm validation 60. At that point, the corresponding documentation 48, 50, or 52 is encoded into the blockchain ledger storage system 64. The encoding into the blockchain ledger storage system 64 may include the ledger controller's 56 metadata also confirming the validation 60.

Even though a ledger controller 56 may be required for validation, the encoding may still be conducted with the individual's selected key, meaning that the individual may be the only one to be able to access the documentation 48, 50, 52 on the blockchain ledger storage system 64. Furthermore, since the addition of the documentation 48, 50, 52 is transmitted 68 to a network 70 that is accessible through the Internet, the documentation 48, 50, 52 may be accessed by the individual from anywhere. In one embodiment, an individual would be able to share a temporary key or code with others that would permit them to access the documentation 48, 50, 52, for example, by scanning the visual code 37 linked to the individual's blockchain ledger storage system 64.

Figure 8:
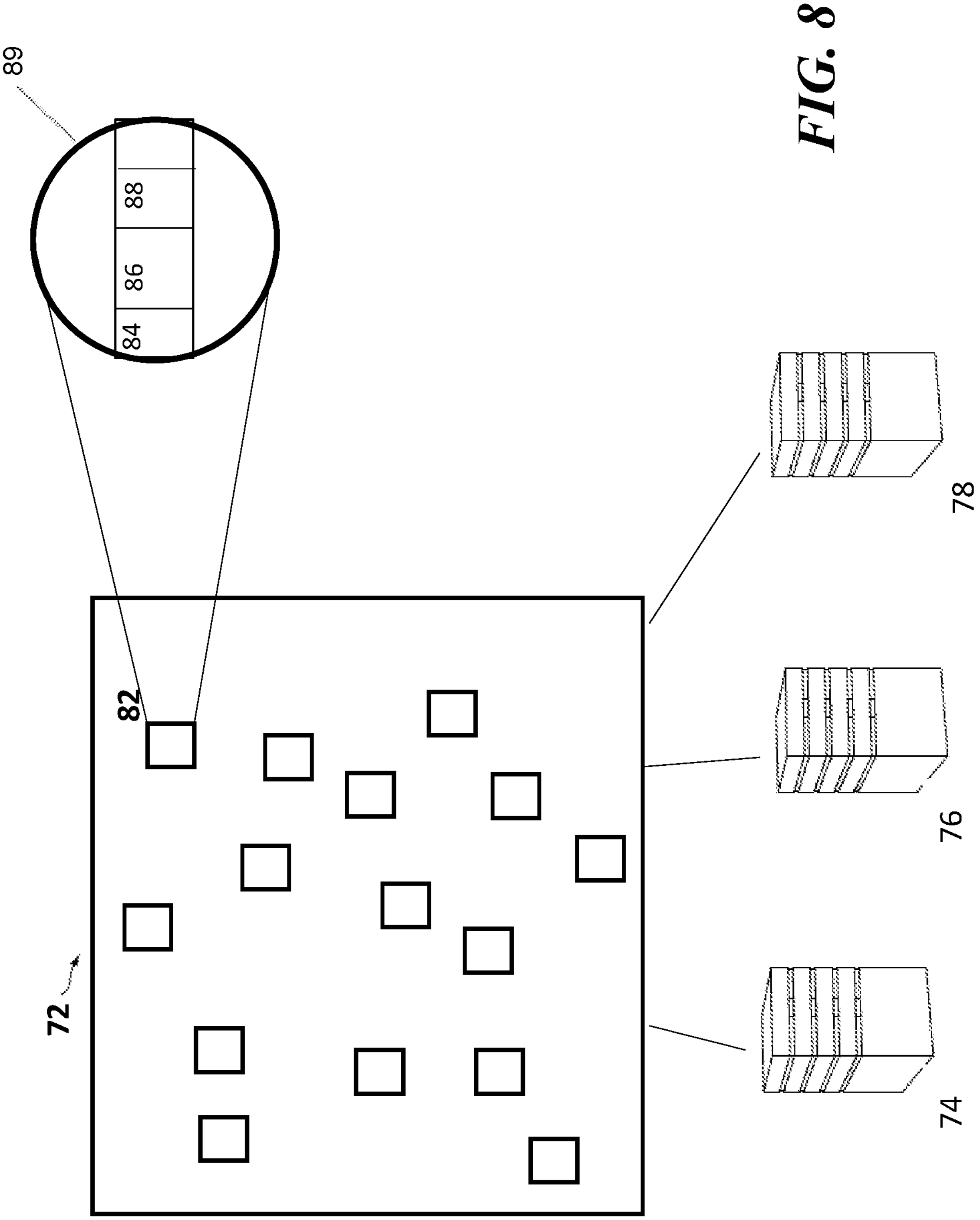
FIG. 8 is a block diagram illustrating an embodiment of a set of ledger storage systems connected to a network, according to various aspects of the present disclosure.

FIG. 8 is a block diagram illustrating a set of ledger storage systems connected to a network 72, according to various aspects of the present disclosure. In this embodiment, a network or virtual network 72 contains a set of ledger storage systems 82. The set of ledger storage systems 82 each contain one or more portions of information 84, 86, 88. Computers 74, 76, 78 may access the network 72 and the ledgers therein 82. In most embodiments, the repository 10 is accessible through the network 72, and any of the computers 74, 76, 78 because metadata concerning the repository's information is uploaded into the ledger (e.g., not the actual file from the repository 10). The repository 10 would only be accessible to those who re-sent the correct decoded metadata from the ledger. Each ledger in the set of ledger storage systems 82 is linked to a visual code 37.

In one embodiment, the network 72 is a public network located on the Internet designed to transmit information into one or more ledger storage systems 82. In most embodiments, computers within the network 72 may also store such information. Other computers 74, 76, 78 are also connected to the Internet and may access the network 72 at any time. In this embodiment, the other computers 74, 76, 78 may be controlled by any member of the public, including without limitation, any individual in the world, or entities, including employers, sovereigns, institutions, and organizations. The other computers 74, 76, 78 may also be controlled by software, including AI software. In this embodiment, each of the ledgers of the set of ledger storage systems 82 is assigned a unique data subject. The ledger in the set of ledger storage systems 82 contains portions of information 84, 86, 88 in a particular section 89. A section 89 may correspond to certain metadata encoded into the ledger. The ledger may also contain multiple sections 89, and the multiple sections 89 may or may not correspond to a blockchain transaction or an event.

In this embodiment, the subject assigned to the ledger is adding information and experiences about the subject's daily activities to the ledger. The subject may select a variety of different codes to store various information about daily activities. For example, the portion of information 84 may be private only to the subject. The portion of information 86 may be accessible by any member of the public. Additionally, the portion of information 88 may be accessible only to certain individuals who have the appropriate key. Each of the other subjects assigned to different ledgers are participating in their own unique daily activities and are similarly encoding selected information into their assigned ledgers on the network 72. Because subjects in a typical embodiment may be adding activities to the ledger on a periodic basis, each ledger will be unique. The ledger will reflect the identity of a unique individual having a set of unique experiences. In this manner, the ledger is as unique as a fingerprint. In a preferred embodiment, the data subject is the only ledger controller. Accordingly, the data subject is the only person who may choose to add information to a ledger.

In the preferred blockchain ledger embodiment, information may only be added to a ledger—it cannot be removed by any computer on the network. In preferred embodiments, only identifiers are on the blockchain. However, aspects of the present disclosure contemplate that a data subject may encode information into a ledger that refers to the repository containing experiential information. For example, a data subject may encode reference metadata into a ledger where the metadata hyperlinks, or provides access to selected information stored in the repository. Once added to the ledger, the reference metadata cannot be removed. However, the data subject may at any time restrict or delete the information on the repository to which the reference metadata refers, links, or provides access. Therefore, although the ledger cannot be changed, the information to which the ledger refers (e.g., on other databases) may be changed.

Subjects may also encode information, and integrate metadata into the blockchain that contains information useful for a smart contract. For example, a subject may encode a smart sales contract into the ledger. One or more computers with access to the ledger (and the smart contract) may cause the sale and shipment of an item located in a third-party warehouse if an entity pays the purchase order in cryptocurrency. A computer 74 may access the purchase order, and transfer the requested amount of cryptocurrency. A separate computer 76 may confirm the transfer of the cryptocurrency and upload that information to the Internet. A different computer 78 may ship a product based on the transfer and confirmation.

In other embodiments, computers 74, 76, 78 may request information on any of the ledgers in the set of ledger storage systems 82 within the network 72 at any time for any reason, and at any level of detail. A certain computer 74 may wish to evaluate a subject's experiences to determine a fact about the subject. Each computer 74, 76, 78 evaluating the subject may have a different evaluation protocol. The computer 74 may be controlled by a potential employer. The potential employer may wish to evaluate the subject's experiences but need corroborative data about the experiences. Section 89 may correspond to a subject's discrete experience in which the potential employer is interested. The ledger may contain a portion of information 84 that describes the experience in the subject's own words. The ledger may also contain information 86 purportedly written by a third party who claimed to have been at the experience with the subject. Finally, the ledger may contain institutional, third party, or government-issued metadata 88 that separately confirms that the subject and the third party attended the experience.

Depending on the goals of the potential employer 74, a portion of corroborative data in connection with information about the subject's discrete experience may cause the potential employer 74 to understand that the subject's discrete experience constitutes verified information, and thereby satisfy the potential employer 74. Computer 76 may be operated by the government entity that issued the metadata 88. The computer 76 may request information about the same section 89 of the ledger and determine that the metadata 88 is legitimate based on the computer's 76 separate records. The computer 76 may confirm the same on the Internet, or by using a separate database. Computer 78 may be controlled by a friend who wishes to view the ledger for entertainment purposes. The friend may only view information 84.

In preferred embodiments, a subject may have decided before passing away to employ an identity management scheme embodied by aspects of the present disclosure, including creating a repository and ledger corresponding to the subject's identity. The subject would also have selected software control or control by a different individual, e.g., family members. In typical embodiments, the subject may make this selection through a trust instrument, a will, or a contract. Further, in preferred embodiments, the subject may also make a selection for certain AI avatar(s) that may communicate and interact with others once the subject is deceased.

In one embodiment, the family of the subject creates a repository 10 and ledger in the set of ledger storage systems 82 for the subject, and authorizes AI software as the only repository controller 10 and the only ledger controller. The software adds information to the ledger that may be public information, or may have been information that was private to the subject during the subject's life, e.g., information from a private email account. The software adds information to the ledger in such a manner as to create what would otherwise have been a ledger of or about the subject's life. In other words, the software adds to the blockchain chronologically as if the subject had done so throughout the subject's life. The software may decide which information will be encoded as private to the software only, e.g., documents that the subject would have never shared with anyone, such as a diary. Similarly, the software may decide which information will be encoded publicly and semi-privately. The software may also have control of cryptocurrency that the subject owned during the subject's life. Once the software creates the ledger within the set of ledger storage systems 82, computers 74, 76, 78 controlled by family members, friends, or sellers may request information from the ledger and also correspond with the software (which may correspond back). The computer 74 controlled by the family may request information from the ledger and correspond with the software to convey personal thoughts and feelings, or reminiscence about shared experiences. Friends may correspond with the software similarly, but may reminiscence only about a different set of shared experiences. The computer 78 controlled by the sellers may access the ledger, and on that basis, interact with the software to attempt to sell a product or an investment opportunity.

In a preferred embodiment, an AI avatar would have control over the subject's cryptocurrency account(s). In this embodiment, the data subject has one or more of the most popular and frequently used cryptocurrency, for example, Bitcoin, Ethereum, Tether, BNB, XRP, or USD Coin. This increases the likelihood that at least one cryptocurrency account may be active for an indefinite (eternal) time period. The data subject and the AI avatar would be the only repository controllers and ledger controllers. Depending on the preferences of the underlying subject, the AI avatar would have the capabilities to create and implement smart contracts by encoding them into the ledger. In this manner, both the AI avatar and the data subject may independently interact with others. The AI avatar's identity is based on, and accurately depicts and embodies, the data subject's identity. Therefore, both the AI avatar and the data subject may interact with others using the same identity.

Aspects of the present disclosure also contemplate that software may continue to operate consistent with a static identity after the data subject dies. At that point, the software may be the only repository controller and the only ledger controller. The software may also retain sole access to the cryptocurrency account(s). The software, potentially operating through an AI avatar, may similarly retain all capabilities to create and implement smart contracts by encoding them into the ledger. The software would use these capabilities, including the implementation of an AI avatar, to act within the subject's identity. For however long the software continues to operate, the software would attempt to emulate the identity of the data subject while the data subject was alive (e.g., the AI avatar would have a static identity because its programmed purpose would be emulate the data subject's entity). If an AI avatar was presented with a question at any point after the data subject died, then the AI avatar would attempt to answer, or otherwise resolve that question as the data subject would have done when alive. In most embodiments, such static identity setting of the software would be irreversible, but in other embodiments the deceased data subject's estate would control whether and how the software implemented such static identity.

Figure 9:
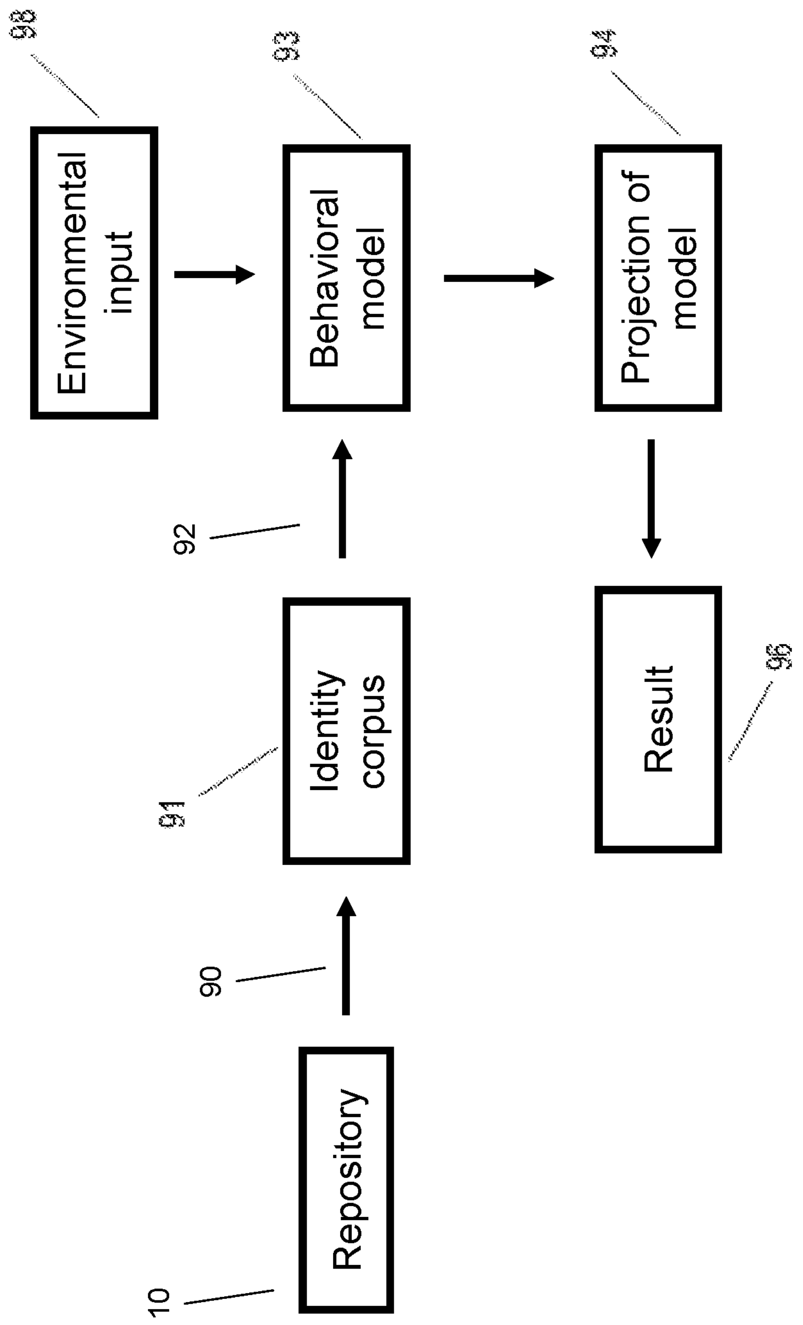
FIG. 9 is a flow chart illustrating an embodiment of a method relating to a static identity, according to various aspects of the present disclosure.

FIG. 9 is a flow chart illustrating an embodiment of a method related to a static identity, according to various aspects of the present disclosure. FIG. 9 shows the repository 10 associated with the data subject. FIG. 9 further shows that the data subject, when alive (or through the data subject's estate after death), has selected 90 certain information from the repository 10 for an identity corpus 91. Typically, the data subject, when alive, would control such selection, and may confirm the selection through entering metadata on the repository 10 for certain events. Once selected, the information from the identity corpus 91 is transferred 92 to a software behavioral model 93, for example, generative AI software. In most embodiments, the data subject would select the parameters for the behavioral model 93 to achieve a certain type of projection of the model, or interaction, or result of the behavioral model 93 that best fits how the data subject would have interacted with any particular environmental input 98 while alive. During operation, which may occur while the data subject is alive or deceased, the behavioral model 93 will receive environmental input 98. Such environmental input 98 is information derived from some source outside of the software. The environmental input 98 may be in the form of electronic or analog data, and may include audio, video, or text. The environmental input may include information about the physical world, anything present in any book, or on the Internet, or any form of electronic data.

Based on the environmental input 98, the model may determine whether and how to project a response. The determination is about the substantive content of the response (if any), and the form of a projection 94. Typically, the model will determine a particular projection 94 to accomplish a certain goal, e.g., to accurately emulate the deceased data subject. After the model determines the appropriate projection 94, the model may implement a result 96 of the projection 94. In a typical embodiment, the projection 94 may occur through a selected avatar. The projection 94 is some kind of activity expressed outside of the software itself. The projection may be in any form. For example, the model may draft and send an email over the Internet, or make a voice telephone call over public phone lines using a voice synthesizer based on the deceased subject's voice, or conduct a transaction using a cryptocurrency or other online account. After projecting 94 a response to an environmental input 98, a result 96 will occur. The result 96 may be any occurrence, or the absence of any occurrence after the implementation of the projection 94. For example, if the environmental input 98 is an email from a living relative about their day, the model may determine that a voice call is an appropriate response, and initiate a voice call 94, resulting in the relative picking up the phone and engaging in a conversation. The result 96 may be both narrowly, or broadly, defined by the behavioral model 93, or there may be multiple results 96 for any projection 94. In the above example, the result 96 from the projection 94 may be that the relative picked up the phone; the result 96 may be that the relative engaged in a conversation; or result 96 may be that the relative took some action based on the conversation after it was over; or the result 96 may be each of those occurrences. The result 96 may be the non-occurrences of other potential outcomes, for example, that the relative did not take a particular action based on the conversation. Each result may be a further environmental input 98 that prompts the behavioral model 93 to determine whether a projection 94 is appropriate (and how).

In other embodiments, the data subject may select whether the AI avatar shall have dynamic identity. In such embodiments, the AI avatar would be the only repository controller and the only ledger controller. The AI avatar would retain sole access and control to any selected portions of the data subject's estate, including cryptocurrency accounts. The AI avatar would retain all capabilities to create and implement smart contracts by encoding them into the ledger. The AI avatar would use these capabilities to act consistent with the data subject's identity when the data subject was alive, but sufficiently flexible to adapt a deceased data subject's identity to new and ever-changing environmental input 98.

Figure 10:
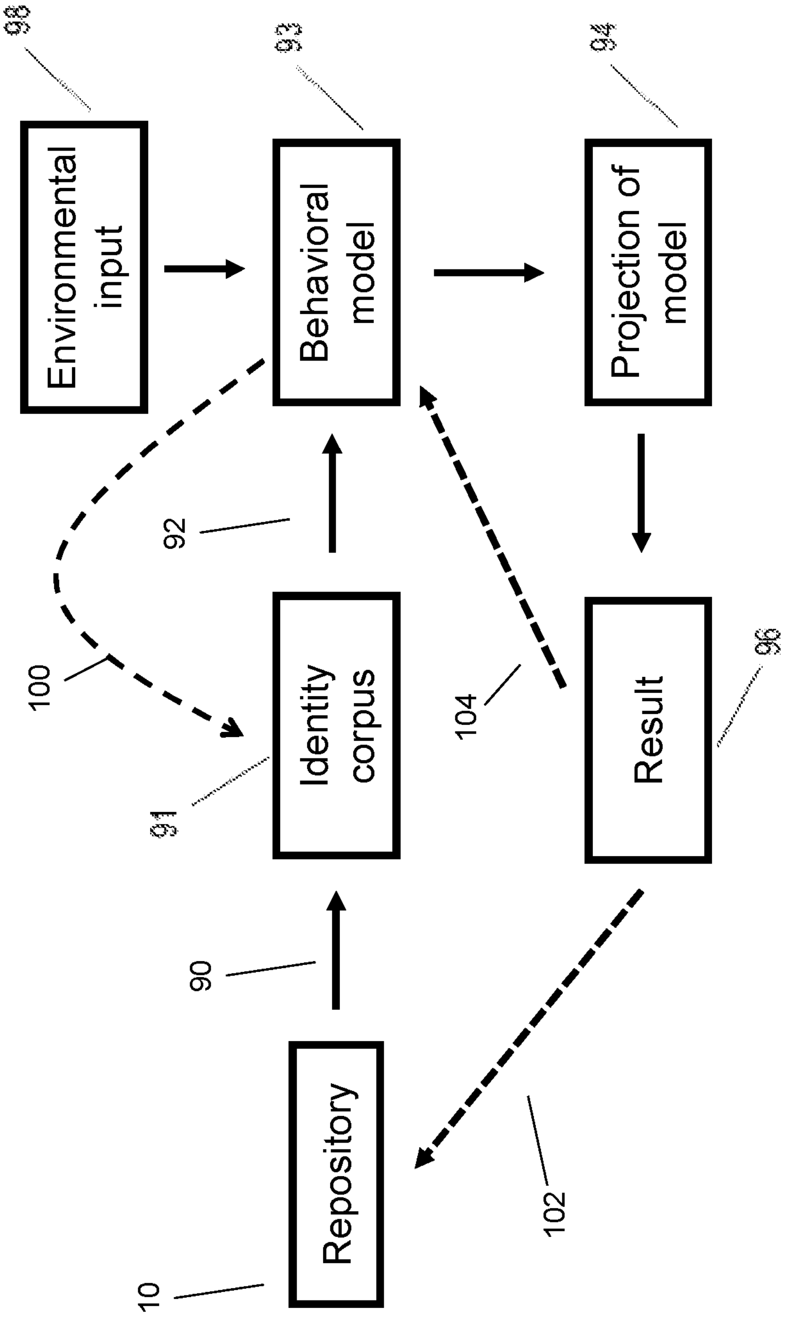
FIG. 10 is a flow chart illustrating an embodiment of a method relating to a dynamic identity, according to various aspects of the present disclosure.

FIG. 10 is a flow chart illustrating an embodiment of a method relating to a dynamic identity, according to various aspects of the present disclosure. Similar to the static identity embodiment, the repository 10 is associated with a data subject. Portions of the repository 10 have been selected 90 to create an initial identity corpus 91. Typically, a data subject, when alive, would control the content identified for the initial identity corpus 91. Similar to the static identity embodiment, the information from the identity corpus 91 is transferred 92 to a software behavioral model 93, for example, generative AI software. In the dynamic identity embodiment, the identity corpus 91 may change as the behavioral model 93 operates. In most embodiments, the data subject would select the parameters for the behavioral model 93. For a dynamic identity embodiment, the data subject would usually select parameters to achieve flexibility for the behavioral model 93 to act substantially consistent with the data subject's identity during life, while continuing to update the identity corpus 91. Such selected parameters would attempt to accurately account for future information that may be added to the identity corpus 91, and future environmental inputs 98. Each such future information or future inputs may be different than those encountered during the data subject's life.

The data subject's selection of the initial identity corpus 91 provides a base for the dynamic identity behavioral model to further develop and add to the identity corpus 91 (after the data subject's death). The behavioral model 93 is based on a changing identity corpus 91, and so the behavioral model 93 may change. However, the corpus will always retain the base information selected by the data subject. Additional information may simply be added to the identity corpus 91 after the data subject's death. Therefore, at the time of death, both the behavioral model 93 and the data subject will have an overlap of significant information concerning the data subject's experiences. Further, since the behavioral model 93 is developed through the base information selected by the data subject, then at death, the generative AI behavioral model 93 will have developed with a significant amount of information concerning the data subject's experiences. Therefore, any further development of the behavioral model 93 after the data subject's death is in continuity with the behavioral model's original state at the time of death.

In the dynamic identity embodiment, there are two ways the behavioral model 93 may change. The result may be transferred 104 back to the behavioral model 93 through result 96 information. The result 96 information may contain data about the specific environmental input 98, and behavioral modeling activity, including the projection 94, that was related to the result 96. The behavioral model 93 may determine whether the result achieved a goal consistent with the data subject's identity corpus 91. The behavioral model 93 may change its model, or supporting parameters accordingly (e.g., the software model may reprogram portions of its code based on the transfer 104 of the result 96 information to the behavioral model 93).

Additionally, the result 96 information may be transferred 102 into the repository 10, and from there to the identity corpus 91. This transfer may cause a change in the behavioral model 93 when the result 96 information is transferred 92 to the behavioral model 93. The behavioral model 93 may select 90 the result 96 information for addition 100 into the identity corpus 91, and may organize such information in the identity corpus 91 to ensure that the result 96 information is accurately categorized with existing information. As new information is inserted into the identity corpus 91, new metadata is also added 100 to organize and categorize the new information. Aspects of the present disclosure contemplate the model adding 100 and organizing new information relationally with the information and metadata provided by the data subject when the data subject was alive. Therefore, a data subject's experiences, as expressed by information and metadata within the identity corpus 91, may be connected, and in some cases continuous, with new information added by the behavioral model 93 after the data subject's death. In such manner, a behavioral model 93 relying upon such a changing identity corpus 91 may adapt itself to reflect what a data subject would be experiencing, or would have experienced, after the data subject's death. In effect, this embodiment may emulate a data subject's experiences (e.g., provide experiential continuity) after the data subject's death.

Notably, aspects of the present disclosure contemplate that such experiential continuity may be perpetual, subject to the continuing existence of the model (and supporting information) as employed on or through one or more computers. Accordingly, experiential perpetuity would occur. The model's new experiences would continue to be received, organized, and managed within the identity corpus alongside the data subject's experiences during life. The embodiment contemplates that the new information and the information about life experiences are connected at least through organizational management of the identity corpus. In one embodiment, all new information received by the model after the data subject is deceased is connected to at least one portion of information about the subject's life experiences. In other embodiments, to further ensure that the model may suitably emulate a data subject, all new information concerning experiences (and added by the model after the data subject's death) is connected in an identity corpus to all information concerning the data subject's life experiences. In still other embodiments, a portion of the new information is connected to a portion of the data subject's life experiences. In further embodiments, the data subject may attempt to ensure that the data subject's life will overlap with the model's operation. For example, the data subject may select a certain condition when the model will begin to operate, such as the data subject's age, the data subject's medical condition, or the age or medical condition of others. In the many circumstances and embodiments, the data subject may be able to ensure that the data subject's life will overlap with the operation of the model, even if the exact date or time that the data subject's life ends may be uncertain. Accordingly, experiential perpetuity would occur in such embodiments.

In certain embodiments, the model would be implemented in a distributed fashion as to effectively never cease operation or function. Such embodiments would also achieve experiential perpetuity. The model, or a portion of the model, would always operate, and would have redundances in place for events that would cause hardware the model is using to stop. Aspects of the present disclosure contemplate that the distribution of the model, or portion of the model, may permit operation on at least one computer connected to at least one other computer. In typical embodiments, both computers would be connected to the Internet. However, in other embodiments, either computer may be on any other type of network, including a virtual network, or intranet, whether connected or unconnected to the Internet.

For example, the model may be distributed on or through a cloud-based system, so that loss of any hardware operation would not cause the model to cease operation or function. The model may be distributed in any manner to preserve the model's uninterrupted function. For example, to reduce the risk of the model's interruption, the model may be distributed by any combination of geographic distribution, extra-terrestrial distribution, and jurisdictional distribution. Geographic computer distribution of the model, or a portion of the model, may include any terrestrial distribution, including in different terrains or topographies, different biomes and habitats, and including subterranean, marine, or atmospheric (e.g., aircraft or balloon). Extra-terrestrial computer distribution of the model, or a portion of the model, may include distribution in objects or vehicles orbiting a body in the solar system, or otherwise traveling in space. Jurisdictional computer distribution of the model, or a portion of the model, may include distribution in any government's territory, or political subdivision, or in ungoverned or un-administered territory or territory subject to a treaty or treaty organization. Importantly, any such distributions may be combined and linked to further reduce the risk of the model's interruption. Such distribution may reduce the risk of interruption caused by any number of reasons, including natural disasters, legal enforcement or compliance, civil unrest, or war.

Importantly, regardless of whether a data subject chooses to employ a static or dynamic identity embodiment, while alive the data subject may utilize a software tool (e.g., software tools such as debugging, code analysis, profiling, logging, or tracing) so that the data subject may observe the behavioral model 93 functioning. For example, when a data subject experiences something and uploads information to a repository 10 in connection with that experience (and selects the uploaded information for the identity corpus), the data subject may observe how the behavioral model 93 changes based on the new information. To further such observation, the data subject may also provide environmental input 98, and observe the process of projection, and the result. If the data subject observes that the behavioral model 93 does not change properly, or does not change in a way to obtain a desired projection or result, then the data subject may reprogram and/or tune, the behavioral model 93 accordingly. Reprogramming may comprise adding, removing, or changing an algorithm, or portions of it, including individual lines of code. Tuning may include changing parameters or variables while retaining the software's architecture, e.g., basic algorithms for functionality. In a neural network, tuning may include changing weights, and biases.

For example, if a data subject experienced receiving an angry email from a relative, the data subject may provide information concerning that experience into the repository 10 and identity corpus, then provide a related environmental input 98 (e.g., a different angry email from a relative, whether real or fake for tuning purposes) and observe how the behavioral model 93 assesses and determines a projection (e.g., whether the behavioral model 93 selects responding back with an email, and which content for the email the behavioral model 93 generates). If the model's activities are inconsistent with the data subject's actual, real-life response, then the data subject may tune the behavioral model 93 until its activities are consistent. In this manner, the data subject may achieve different goals for the behavioral model 93. Typically, the data subject may tune the behavioral model 93 to try to match the data subject's own behaviors. However, the data subject may tune the behavioral model 93 to achieve other behaviors.

In such embodiments, the data subject may determine what level of change is desired for the AI avatar after the data subject is deceased. In most embodiments, the AI avatar may continue to accept information into the repository and encode the accepted information into the ledger, but the data subject may determine whether and how AI avatar uses that information to develop or change its identity.

In another embodiment, the network 72 is a private network. The other computers 74, 76, 78 may access the network 72 with appropriate network permissions. In this embodiment, an academic institution owns the network 72. The other computers 74, 76, 78 represent private employers who hire graduates from the institution. Each ledger in the set of ledger storage systems 82 is assigned to a single student. No student has more than one ledger. The portions of information 84, 86, 88 on the ledger are contained in a certain section 89 of the student's ledger. This section contains information about an experience that the student participated in during the student's education.

The portions of information 84, 86, 88 may have each been encoded in a different way. For example, a private experience portion of information 84 may be encoded with a unique cryptographic key that no one else other than the student may decode. A video portion of information 86 of a student participating in a high-intensity training session may be semi-public and available only to potential employers. The portion of information 88 that may include a student's biometric data during the high-intensity activity may be semi-private and require the student to provide access permission to a potential employer. Potential employers may choose to access all information on the student's ledger, or may focus on accessing a particular section 89 of the student's ledger. In some embodiments, a section 89 may contain metadata about a particular event or training, so that the potential employer may identify the section 89.

In one embodiment, an employer having appropriate permissions may access a student's ledger to determine if the student has participated in a select activity. For example, if the employer controlling the computer 74 is looking for a professional with experience in assisting heart surgeries, the employer may access the student's ledger to find instances of heart surgery experience. A separate employer using the computer 76 may be looking for a professional with certain qualities that the employer believes align with good bedside manner. That employer may identify a section 89 on each of the ledgers in the set of ledger storage systems 82 in the network 72 that the particular employer believes represents the qualities for good bedside manner. The employer 76 may then access each of the same sections 89 on each of the ledgers of the set of ledger storage systems 82 in the network 72 to evaluate different student experiences. Further, an employer accessing the set of ledger storage systems 82 may wish to filter based on information that the institution confirmed versus information that the institution did not confirm. If the institution created the ledger by a method similar to, or the same as, the method depicted in FIG. 7, a potential employer may only wish to access information on the ledger that a specific ledger controller 56 has confirmed.

In a preferred embodiment, aspects of the present disclosure contemplate efficiently proposing potential opportunities to data subjects. Such potential opportunity proposals are related to the data subject's identity, not identification. The potential opportunities may be based on the data subject's actual or potential interests, activities, or needs. The potential opportunities may be related to a data subject's personal matters, community matters, business matters, family matters, or any combination. In typical embodiments, the data subject would select one or more machines to permit the one or more machines access to one or more portions of data. For example, software operating on the computer 74 may analyze a data subject's ledger and determine the data subject is an opera singer. The software may then evaluate opportunities from multiple sources, include within a public network, to propose potential opportunities related to the data subject's opera singing. The potential opportunities need not strictly encompass the data subject's expressly identified interests, activities, or needs. In this example, the software may propose to the data subject a potential opportunity in radio advertising for a project requiring a singer, or a potential opportunity to contact a relative about a new opera production near the relative's home, or even a potential opportunity to volunteer at a school to teach singing. The data subject would have control over permissions within the software for which information may be available for analysis of such potential opportunities.

In a separate preferred embodiment, aspects of the present disclosure contemplate efficiently proposing matches of employers with employees. Such matching is based on identity, not identification, and so leads to more helpful and meaningful proposals both for employees (concerning which employer to apply to), and to employers (concerning hiring and recruiting decisions). Such proposed matching is only available should the employee and employer both mutually agree in advance. In a preferred embodiment, software on a computer 74 controlled by a potential employer with appropriate permissions may determine an employer's needs and also determine which individuals may fit those needs based on the set of ledger storage systems 82. For example, an employer may input its needs to the software, and the software may analyze the ledgers to determine whether any individuals may satisfy those needs. In a different embodiment, the software may determine an employer's needs from public information, and may analyze the ledgers to determine whether any individuals may satisfy those needs.

The disclosure describes and shows embodiments of various aspects of the present disclosure. The present disclosure also contemplates numerous modifications, changes and substitutions that are also understood to be aspects of the invention. In certain embodiments of the invention, disclosed features may also be removed, or combined with other features that the disclosure contemplates, even if not expressly identified in the disclosure.

We claim the following:

1. A method for managing information, comprising:

a user providing portions of personal information into a repository, the personal information comprising identifier information, and identity information, further comprising at least one image, audio recording, video recording, portion of text, or portion of data connected to a personal experience;

at least one portion of the personal information comprises identifier information further comprising at least one copy of a document issued by a government, and at least one copy of a document issued by an educational institution;

the method having a plurality of event configurations and the method configured to have a user select at least one event configuration having at least an access configuration, the access configuration comprising selecting whether zero or more users have access to the event configuration for each portion of personal information, permitting one or more selected machines to view at least one selected portion of identity information, and at least one portion of selected identifier information, and one or more potential employers control the one or more selected machines;

selecting at least one access configuration for each portion of personal information; and entering one or more portions of personal information into a persistent database, the persistent database is a distributed ledger; and the user accesses the distributed ledger with a visual code, and the user enters at least one portion of personal information into the distributed ledger using a key known to the one or more selected machines, at least one of the one or more selected machines accesses at least one portion of the user's personal information through the distributed ledger.

2. The method of claim 1, wherein:

the identifier information comprises at least one copy of a document issued by a government or by an educational institution, and said government or institution has authenticated the document; and the identity information comprises at least one image, audio recording, video recording, portion of text, or portion of data connected to a personal experience.

3. The method of claim 1, wherein;

the repository comprises a database, and the portions of personal information are provided to the repository through the Internet.

4. The method of claim 3, wherein:

the access configuration comprises selecting whether zero, one, or more individuals have access to each of selected portions of personal information through the Internet.

5. The method of claim 4, wherein:

the access configurations further comprise selecting whether one or more categories of individuals have access to each of selected portions of personal information through the Internet.

6. The method of claim 1, wherein:

the entering comprises entering a portion of personal information into the persistent database using a key.

7. The method of claim 6, wherein:

the persistent database is distributed across a plurality of machines, and a visual code identifies the portions of personal information entered into the persistent database.

8. The method of claim 7, wherein:

one or more of the plurality of machines authenticates the entering of the one or more portions of personal information into the persistent database.

9. The method of claim 1, wherein:

the repository is a cloud service;

the distributed ledger is a blockchain; and a visual code identifies the portions of personal information entered into the blockchain.

10. A system for managing information, comprising:

a repository containing portions of personal information provided by a user, and the user being the only user to have access to all of the portions of personal information, the portions of personal information comprising identifier information, and identity information;

the repository configured to be a cloud service operably connected to the Internet;

the user having access to each of the portions of personal information; and at least one access configuration selected by the user for each of the portions of personal information, the repository being operably connected to a persistent database and the persistent database configured to be a blockchain for entering one or more portions of personal information into the persistent database;

at least one access configuration permits a first selected machine to access at least one portion of personal information through the repository;

at least one access configuration permits a second selected machine to access at least one different portion of personal information through the blockchain; and wherein a potential employer controls the first and second selected machine.

11. The system of claim 10, wherein:

the identifier information comprises at least one copy of a document issued by a government, or by an educational institution; and the identity information comprises at least one image, audio recording, video recording, portion of text, or portion of data connected to a personal experience.

* * * * *